(12) United States Patent
Eide et al.

(10) Patent No.: US 10,557,748 B2
(45) Date of Patent: Feb. 11, 2020

(54) WIRELESS SCALE AND RELEASE SYSTEM FOR SECURED CONTENT

(71) Applicants: Johan Eide, Sebastopol, CA (US); Kye Miranda, San Diego, CA (US)

(72) Inventors: Johan Eide, Sebastopol, CA (US); Kye Miranda, San Diego, CA (US)

(73) Assignee: Secure Scale Holding LLC, Redding, CA (US)

( * ) Notice: Subject to any disclaimer, the term of this patent is extended or adjusted under 35 U.S.C. 154(b) by 0 days.

(21) Appl. No.: 16/147,078

(22) Filed: Sep. 28, 2018

(65) Prior Publication Data

US 2019/0101435 A1 Apr. 4, 2019

Related U.S. Application Data

(60) Provisional application No. 62/565,935, filed on Sep. 29, 2017.

(51) Int. Cl.
| | |
|---|---|
| *G01G 19/18* | (2006.01) |
| *G01G 21/28* | (2006.01) |
| *G01G 23/37* | (2006.01) |
| *G06T 7/62* | (2017.01) |

(52) U.S. Cl.
CPC ......... *G01G 23/3735* (2013.01); *G01G 19/18* (2013.01); *G01G 21/283* (2013.01); *G06T 7/62* (2017.01)

(58) Field of Classification Search
CPC ........ G06T 7/62; G01G 19/18; G01G 21/283; G01G 21/58; G01G 21/60; G01G 23/3735; G01G 19/14
See application file for complete search history.

(56) References Cited

U.S. PATENT DOCUMENTS

| | | | | |
|---|---|---|---|---|
| 4,096,950 | A * | 6/1978 | Brook | B07C 5/18 209/593 |
| 5,004,093 | A * | 4/1991 | Blezard | B65B 43/46 141/170 |
| 6,696,650 | B2 * | 2/2004 | Muller | G01G 19/60 177/131 |
| 6,800,818 | B2 * | 10/2004 | Balboni | B65B 3/003 141/83 |
| 6,943,304 | B1 * | 9/2005 | Brady | G01G 19/60 177/148 |
| 7,408,125 | B2 * | 8/2008 | Lentine | A01K 97/00 177/148 |
| 7,550,684 | B2 * | 6/2009 | Kritzler | G01G 19/58 177/148 |

(Continued)

OTHER PUBLICATIONS

International Search Report dated Nov. 30, 2018.

*Primary Examiner* — Randy W Gibson
(74) *Attorney, Agent, or Firm* — Johan Eide; Christopher Pilling; My Patent Guys

(57) ABSTRACT

The present disclosure pertains to a wireless scale, interface and release system for recreational and commercial weighing of items of any kind in a uniform and secure manner, furthermore designed for use on any form of bodies of water, tributaries, ocean, vehicle or land. The present disclosure comprises, scale inside of a waterproof housing, and a user interface to prompt the user through the weighing and release of the item or animal.

31 Claims, 29 Drawing Sheets

(56) References Cited

U.S. PATENT DOCUMENTS

| | | | |
|---|---|---|---|
| 8,629,357 B2* | 1/2014 | Moon | G01G 19/58 |
| | | | 177/148 |
| 8,921,716 B2* | 12/2014 | Saulters | G01G 19/60 |
| | | | 177/148 |
| 8,952,276 B2* | 2/2015 | Lin | A45C 13/30 |
| | | | 177/148 |
| 10,260,934 B2* | 4/2019 | Esmail | G01G 19/52 |
| 10,365,150 B2* | 7/2019 | Natarajan | G01G 19/58 |
| 2004/0007396 A1 | 1/2004 | Muller et al. | |
| 2007/0045010 A1 | 3/2007 | Kasperek | |
| 2007/0209843 A1 | 9/2007 | Hannon | |
| 2010/0018783 A1 | 1/2010 | Thompson | |
| 2010/0181119 A1 | 7/2010 | Saigh et al. | |
| 2011/0290569 A1 | 12/2011 | Turner | |
| 2013/0220708 A1* | 8/2013 | Kim | G01G 19/025 |
| | | | 177/3 |
| 2014/0063180 A1 | 3/2014 | Sharma | |
| 2015/0294641 A1 | 10/2015 | Jones | |

\* cited by examiner

WIRELESS SCALE AND RELEASE SYSTEM FOR SECURED CONTENT

CROSS-REFERENCE

This application claims the benefit of U.S. Provisional Application No. 62/565,935, filed Sep. 29, 2017, which is hereby incorporated herein by reference.

BACKGROUND OF THE INVENTION

Accurate weight and record keeping is advantageous for personal, competitive, and business means to form keepsakes, enact accountability measures, and efficiently collect data. Hand scales, cameras, and locational sensors have been traditionally employed for such means.

SUMMARY OF THE INVENTION

Provided herein is an object weighing and release system comprising: a scale configured to measure a weight of the object; a release mechanism; an input device configured to receive an input; a camera configured to capture an image of the object, a surrounding of the object, or both; a display; a mobile communication device; a mobile processor in functional communication with, the scale, the release mechanism, the input device, the camera, the display, and the mobile communication device. In some embodiments, the scale comprises a strain gauge, a load cell, a transducer, a spring, or any combination thereof. In some embodiments, the release mechanism comprises: a first clamp arm; and a second clamp arm attached to the first clamp arm and comprising a clamping mechanism configured to engage and disengage with the first clamp arm to weigh and release the object. In some embodiments, the clamping mechanism comprises a motor, a solenoid, a magnet, a gear, a pulley, or any combination thereof. In some embodiments, the input device comprises a touchscreen, a button, a camera, a microphone, an input port, or any combination thereof. In some embodiments, the mobile processor in functional communication with the camera is configured to adjust a camera setting. In some embodiments, the camera setting comprises a number of pixels, an aperture size, an exposure rate, a frame rate, a color tint, or any combination thereof. In some embodiments, the display is configured to display the image, the weight, the input, or any combination thereof. In some embodiments, the display comprises an LCD screen, an LED screen, a PDP display, an OLED display, a TFT display, or any combination thereof. In some embodiments, the display and the input comprise a single touch screen. In some embodiments, the mobile communication device is configured to transmit the image, the weight, the input, or any combination thereof. In some embodiments, the mobile communication device comprises a Wi-Fi device, a cellular device, a Bluetooth device, a satellite mobile communication device, a radio device, a LoRa device, a WLAN device, a microwave communication device, or any combination thereof. In some embodiments, the system further comprises a waterproof housing. In some embodiments, at least one of the camera, the scale, the release mechanism, the input device, the display, the mobile communication device, and the mobile processor are within the waterproof housing, attached to the waterproof housing, or within and attached to the waterproof housing. In some embodiments, the release mechanism is attached to the scale, and wherein the scale is attached to the waterproof housing. In some embodiments, the release mechanism is attached to the scale by a non-rigid cable. In some embodiments, the system further comprises a gimbal, wherein the camera is attached to gimbal and wherein the gimbal is attached to the waterproof housing. In some embodiments, the gimbal is configured to translate the camera, rotate the camera, or both, with respect to the housing. In some embodiments, the mobile processor is in further in functional communication with the gimbal. In some embodiments, the waterproof housing comprises at least one of an anti-tampering mechanism, and a unique identification marker. In some embodiments, the anti-tampering mechanism comprises a lock, a fingerprint reader, an iris scanner, communication encryption, password software, or any combination thereof. In some embodiments, the unique identification mark comprises an alphanumeric identification, a numeric identification number, a QR code, a barcode, an RFID tag, or any combination thereof. In some embodiments, the system further comprises at least one of a sensor and a light. In some embodiments, the sensor comprises a proximity sensor, a thermometer, GPS sensor, a light sensor, a microphone, an accelerometer, an inclinometer, a resistometer, a counter, a microphone, an RFID sensor, an ultrasonic sensor, a capacitive sensor, an inductive sensor, a magnetic sensor, a RADAR, a SONAR, a rain gauge, a wind gauge, an altimeter, or any combination thereof. In some embodiments, the mobile processor is configured to provide a mobile application comprising: a software module receiving the input and the weight of the object; a software module disengaging the release mechanism; a software module directing the camera to capture the image, receive the image, or both; a software module engaging the release mechanism; and a software module directing the display, the mobile communication device, or both based on the input, the engagement of the release mechanism, the disengagement of the release mechanism, the weight of the object, the image, or any combination thereof. In some embodiments, the software module directs the mobile communication device to transmit at least one of the engagement of the release mechanism, the disengagement of the release mechanism, the weight of the object, and the image. In some embodiments, the software module directs the mobile communication device to transmit at least one of the engagement of the release mechanism, the disengagement of the release mechanism, the weight of the object, the image based on the input. In some embodiments, the mobile application further comprises a software module recording a tare weight based on the input and the scale measurement recorded while the release mechanism is disengaged. In some embodiments, the mobile application further comprises a software module receiving a sensed data from a sensor. In some embodiments, the software module directs the mobile communication device to transmit at least one of the engagement of the release mechanism, the disengagement of the release mechanism, the weight of the object, the image based on the sensed data. In some embodiments, the mobile application further comprises a software module applying an image processing algorithm to one or more of the weight of the object, the input, and the image to determine a volume, length, width, thickness species, or any combination thereof of the item. In some embodiments, the image processing algorithm comprises artificial intelligence image processing algorithm.

Another aspect provided herein is an object weighing and release platform comprising: a mobile system comprising: a scale configured to measure a weight of the object; a release mechanism; an input device configured to receive an input; a camera configured to capture an image of the object, a surrounding of the object, or both; a display; a mobile communication device; and a base station comprising a base communication device in communication with the mobile communication device. In some embodiments, at least one of the mobile system and the base station comprise a mobile processor. In some embodiments, the mobile system comprises the processor, and wherein the processor is in functional communication with the scale, the release mechanism, the input device, the camera, the display, and the mobile communication device. In some embodiments, the release mechanism comprises: a first clamp arm; and a second clamp arm attached to the first clamp arm and comprising a clamping mechanism configured to engage and disengage with the first clamp arm to weigh and release the object. In some embodiments, the clamping mechanism comprises a motor, a solenoid, a magnet, a gear, a pulley, or any combination thereof. In some embodiments, the scale comprises a strain gauge, a load cell, a transducer, a spring, or any combination thereof. In some embodiments, the input device comprises a touchscreen, a button, a camera, a microphone, an input port, or any combination thereof. In some embodiments, the mobile processor in functional communication with the camera is configured to adjust a camera setting. In some embodiments, the camera setting comprises a number of pixels, an aperture size, an exposure rate, a frame rate, a color tint, or any combination thereof. In some embodiments, the display is configured to display the image, the weight, the input, or any combination thereof. In some embodiments, the display comprises an LCD screen, an LED screen, a PDP display, an OLED display, a TFT display, or any combination thereof. In some embodiments, the display and the input comprise a single touch screen. In some embodiments, the mobile communication device is configured to transmit the image, the weight, the input, or any combination thereof. In some embodiments, the communication member comprises a Wi-Fi device, a cellular device, a Bluetooth device, a satellite mobile communication device, a radio device, a LoRa device, a WLAN communication member, a microwave mobile communication device, or any combination thereof. In some embodiments, the mobile system further comprises a waterproof housing. In some embodiments, at least one of the camera, the scale, the input device, the display, the mobile communication device, and the mobile processor are within the waterproof housing, attached to the waterproof housing, or within and attached to the waterproof housing. In some embodiments, the release mechanism is attached to the scale, and wherein the scale is attached to the waterproof housing. In some embodiments, the release mechanism is attached to the scale by a non-rigid cable. In some embodiments, the mobile system further comprises a gimbal, wherein the camera is attached to gimbal and wherein the gimbal is attached to the waterproof housing. In some embodiments, the gimbal is configured to translate the camera, rotate the camera, or both, with respect to the housing. In some embodiments, the mobile processor is in further in functional communication with the gimbal. In some embodiments, the waterproof housing comprises at least one of an anti-tampering mechanism, and a unique identification marker. In some embodiments, the anti-tampering mechanism comprises a lock, a fingerprint reader, an iris scanner, communication encryption, password software, or any combination thereof. In some embodiments, the unique identification mark comprises an alphanumeric identification, a numeric identification number, a QR code, a barcode, an RFID tag, or any combination thereof. In some embodiments, the mobile system further comprises at least one of a sensor and a light. In some embodiments, the sensor comprises a proximity sensor, a thermometer, GPS sensor, a light sensor, a microphone, an accelerometer, an inclinometer, a resistometer, a counter, a microphone, an RFID sensor, an ultrasonic sensor, a capacitive sensor, an inductive sensor, a magnetic sensor, a RADAR, a SONAR, a rain gauge, a wind gauge, an altimeter, or any combination thereof. In some embodiments, the mobile processor is configured to provide a mobile application comprising: a software module receiving the input and the weight of the object; a software module disengaging the release mechanism; a software module directing the camera to capture the image, receive the image, or both; a software module engaging the release mechanism; and a software module directing the display, the mobile communication device, or both based on the input, the engagement of the release mechanism, the disengagement of the release mechanism, the weight of the object, the image, or any combination thereof. In some embodiments, the software module directs the mobile communication device to transmit at least one of the engagement of the release mechanism, the disengagement of the release mechanism, the weight of the object, and the image. In some embodiments, the software module directs the mobile communication device to transmit at least one of the engagement of the release mechanism, the disengagement of the release mechanism, the weight of the object, the image based on the input. In some embodiments, the mobile application further comprises a software module recording a tare weight based on the input and the scale measurement recorded while the release mechanism is disengaged. In some embodiments, the mobile application further comprises a software module receiving a sensed data from a sensor. In some embodiments, the software module directs the mobile communication device to transmit at least one of the engagement of the release mechanism, the disengagement of the release mechanism, the weight of the object, the image based on the sensed data. In some embodiments, the mobile application further comprises a software module applying an image processing algorithm to one or more of the weight of the object, the input, and the image to determine a volume, length, width, thickness species, or any combination thereof of the item. In some embodiments, the image processing algorithm comprises artificial intelligence image processing algorithm. In some embodiments, the base station further comprises a base camera configured to capture a base image of the object, the surrounding of the object, or both. In some embodiments, the base station further comprises a base sensor configured to measure a base sensed data. In some embodiments, the base sensor comprises a proximity sensor, a thermometer, GPS sensor, a light sensor, a microphone, an accelerometer, an inclinometer, a resistometer, a counter, a microphone, an RFID sensor, an ultrasonic sensor, a capacitive sensor, an inductive sensor, a magnetic sensor, a RADAR, a SONAR, a rain gauge, a wind gauge, an altimeter, or any combination thereof. In some embodiments, the base communication device is configured to transmit, receive, or both, the direction of the engagement of the release mechanism, the disengagement of the release mechanism, the base sensed data, the weight of the object, the image, the base image, or any combination thereof. In some embodiments, the base station further comprises a light, a buoy, a water vessel, a land structure, or any combination thereof. In some embodiments, the vessel comprises a vehicle, vessel, a boat, a ship, a canoe, or any combination thereof. In some embodiments, the land structure comprises a stand, a tripod, a building, or any combination thereof.

Provided herein is a mobile weighing and release system comprising: a waterproof handheld scale and housing to weigh, control and issue the release of an item or animal; a downward facing camera within the scale housing used for reassurance of proper release system cycling at predetermined points throughout the weighing cycle; a microcontroller within the scale housing prompting the secure weighing and therefore release cycle of the item or animal being weighed; a display for user interface and interaction throughout the weighing and releasing process; an automated or prompted release system for specific locality of release for the item or animal being weighed; a proximity sensor or positioning information device of any sort to relay the location or motion of the user or weighing/release system devices; a collective base station for collecting, parsing and publishing collected weight and user data; a surrounding visual surveillance system/monitoring system working in collaboration with the weighing and release system to ensure proper system cycling; an communication method, network of scales or network of marine electronic devices working in collaboration or independently to transmit weight or user generated data to a desired base station, memory, communication member, cloud storage, server or localized device. In some embodiments, said housing is connected to or includes an automated or prompted mechanical or electronic release system. In some embodiments, said camera or visual surveillance system stores images of the object or animal held or connected in any way below the scale housing or captures the environment surrounding the mobile weighing and release system. In some embodiments, said camera or visual surveillance system stores captured images internally or transmits images for later legal or professional use. In some embodiments, said camera or visual surveillance system uses infrared, lighting or any form of illumination based upon the time or environmental conditions. In some embodiments, said display comprises of any visual aid, including but not limited to, and LCD, LED, touch screen, PDP, OLED or TFT display. In some embodiments, said display asks, aides, prompts, or causes the user or parties involved to enter into a legally binding contract in agreeance with the weight transmitted or stored. In some embodiments, said display notifies the user or parties involved of success or failure of secured transmission of weight or desired data. In some embodiments, said wherein said release system has proximity sensors attached to or touching the secured or unsecured vehicle, vessel, aircraft, building or environment the user is currently located in. In some embodiments, said release system's activation proximity sensors or locality sensor can be, but is not limited to, RFID, ultrasonic, capacitive, inductive, magnetic, optical, radar, sonar or any global positioning method. In some embodiments, said release system latches, locks or secures in any way the object or animal being weighed until failure of transmission, successful pairing of locality or proximity sensors, user manual activation. In some embodiments, said base station transmits in response to the weight or data transmitted by the weighing and release scale system. In some embodiments, said base station parses, sorts or ranks date or weight by means of scale identification, time of transmission or by comparison to the weighed results of other active scales on the same network, wavelength, frequency, cellular network or satellite network. In some embodiments, said base station displays parsed, sorted, or ranked data and weight visually to the public, back to other scales or publishes the resultant data in any manner. In some embodiments, the base station may consist of: a marine electronics device, sonar unit, fish-finder, server, mobile application, radar, chart plotter, vessel or vehicle radio, vessel or vehicle head unit, vessel or vehicle receiver, vessel or vehicle GPS device, another mobile weighing and release system, a computer, server, or cloud-based server. In some embodiments, the base station can be the first or can be any number of subsequent systems to receive data transmitting from the mobile weighing and release system. In some embodiments, said surveillance system is mounted to or touching the current secured or unsecured building, area, vessel, or vehicle where the user or involved parties are currently locations. In some embodiments, said surveillance system independently or in collaboration with the weighing and release scale system stores, streams or broadcasts the weighing, releasing and use of the weighing and release scale system. In some embodiments, said communication method for object or animal weight and data comprises of any public, private, point-to-point, point-to-multipoint, or mesh networking protocol. In some embodiments, said communication method comprises of, but is not limited to, any of the following: RF, cellular, Bluetooth, LoRa, satellite, WLAN, or microwave methods. The system in some embodiments, wherein at least one of the visual surveillance system and the sensor is mounted to a vehicle, a boat, a ship, a canoe, a stand, a tripod, a motor, navigation light, a building, a structure, or any combination thereof.

Provided herein is a mobile weighing and release system comprising: a mobile scale and release member comprising: a waterproof housing; a scale member capable of measuring a weight of an item; a release member capable of holding and releasing the item; a camera; a display; an input; a sensor capable of sensing a sensor data; a memory; a processor; and a communication member; a base station; and a visual surveillance system capable of capturing a surveillance data. In some embodiments, the camera is capable of capturing an image of the item. In some embodiments, at least one of the visual surveillance system and the sensor is mounted to a vehicle, a boat, a ship, a canoe, a stand, a tripod, a motor, a building, a structure, navigation light or any combination thereof. In some embodiments, the visual surveillance system is capable of capturing the item held in the release member or the environment surrounding the weighing and release scale system. In some embodiments, the processor, base station, visual surveillance system, or camera is capable of applying an image processing algorithm or artificial intelligence algorithm to the image of the item to determine a size of the item, a length of the item, a width of the item, a thickness of the item, a weight of the item, a species of the item, a data related to the item, or any combination thereof held in the release member.

In some embodiments, the memory is capable of storing the image, the weight, communicative member signal strength, the sensor data, or any combination thereof. In some embodiments, the communication member is capable of transmitting the image, the weight, the sensor data, or any combination thereof from the memory to the base station. In some embodiments, the display is capable of showing the image, the weight, the sensor data, a transmission notification, an agreement, or any combination thereof. In some embodiments, the base station is capable of receiving the image, the weight, the sensor data, the agreement, the surveillance data, or any combination thereof. In some embodiments, the base station is further capable of at least one of displaying, storing, and transmitting the image, the weight, the sensor data, the agreement, the surveillance data, or any combination thereof. In some embodiments, the mobile scale and release member further comprises a light. In some embodiments, the display comprises an LCD screen, an LED screen, a touch screen, a PDP, an OLED display, a TFT display, or any combination thereof. In some embodiments, the sensor comprises a proximity sensor, a thermometer, GPS sensor, level, acoustic sensor, microphone, speaker, a microphone, an accelerometer, a load cell, an inclinometer, a resistometer, a counter, an RFID sensor, an ultrasonic sensor, a capacitive sensor, an inductive sensor, a magnetic sensor, an optical sensor, a radar, a sonar, or any combination thereof. In some embodiments, the release system is capable of being activated by a signal from the processor, the input, the communication member, or any combination thereof. In some embodiments, the communication member comprises a point-to-point, communication member, a point-to-multipoint communication member, a mesh communication member, an RF communication member, a cellular communication member, a Bluetooth communication member, a LoRa communication member, a satellite communication member, a WLAN communication member, a microwave communication member, or any combination thereof. In some embodiments, the item comprises an animal, a fruit, a vegetable, a plant, a product or a package. In some embodiments, the sensor is capable of being mounted to a vehicle, a boat, a ship, a canoe, a stand, a tripod, a motor, a building, a structure, or any combination thereof. In some embodiments, the processor is capable of applying an image processing algorithm or artificial intelligence algorithm to the image of the item to determine a size of the item, a length of the item, a width of the item, a thickness of the item, a weight of the item, a species of the item, a data related to the item, or any combination thereof.

Provided herein is a mobile weighing and release device comprising: a waterproof housing; a scale member capable of measuring a weight of an item, a release member capable of holding and releasing the item; a camera; a display; an input; a sensor capable of sensing a sensor data; a memory; a processor; and a communication member. In some embodiments, the camera is capable of capturing an image of the item held in the release member. In some embodiments, the memory is capable of storing the image, the weight, the sensor data, or any combination thereof. In some embodiments, the communication member is capable of transmitting the image, the weight, the sensor data, or any combination thereof from the memory to an external base station. In some embodiments, the display is capable of showing the image, the weight, the sensor data, a transmission notification, an agreement, or any combination thereof. In some embodiments, the mobile scale and release member further comprises a light. In some embodiments, the display comprises an LCD screen, an LED screen, a touch screen, a PDP, an OLED display, a TFT display, or any combination thereof. In some embodiments, the sensor comprises a proximity sensor, a thermometer, GPS sensor, a microphone, an accelerometer, a load cell, an inclinometer, a resistometer, a counter, an RFID sensor, an ultrasonic sensor, a capacitive sensor, an inductive sensor, a magnetic sensor, an optical sensor, a radar, a sonar, or any combination thereof. In some embodiments, the release device is capable of being activated by a signal from the processor, the input, the communication member, or any combination thereof. In some embodiments, the communication member comprises a point-to-point, communication member, a point-to-multipoint communication member, a mesh communication member, an RF communication member, a cellular communication member, a Bluetooth communication member, a LoRa communication member, a satellite communication member, a WLAN communication member, a microwave communication member, or any combination thereof.

BRIEF DESCRIPTION OF THE DRAWINGS

The novel features of the disclosure are set forth with particularity in the appended claims. A better understanding of the features and advantages of the present disclosure will be obtained by reference to the following detailed description that sets forth illustrative embodiments, in which the principles of the disclosure are utilized, and the accompanying drawings of which:

FIG. 24A shows another diagram of an exemplary object weighing and release application;

FIG. 24B shows another diagram of an exemplary object weighing and release application;

FIG. 24C shows another diagram of an exemplary object weighing and release application;

DETAILED DESCRIPTION OF THE INVENTION

Figure 1:
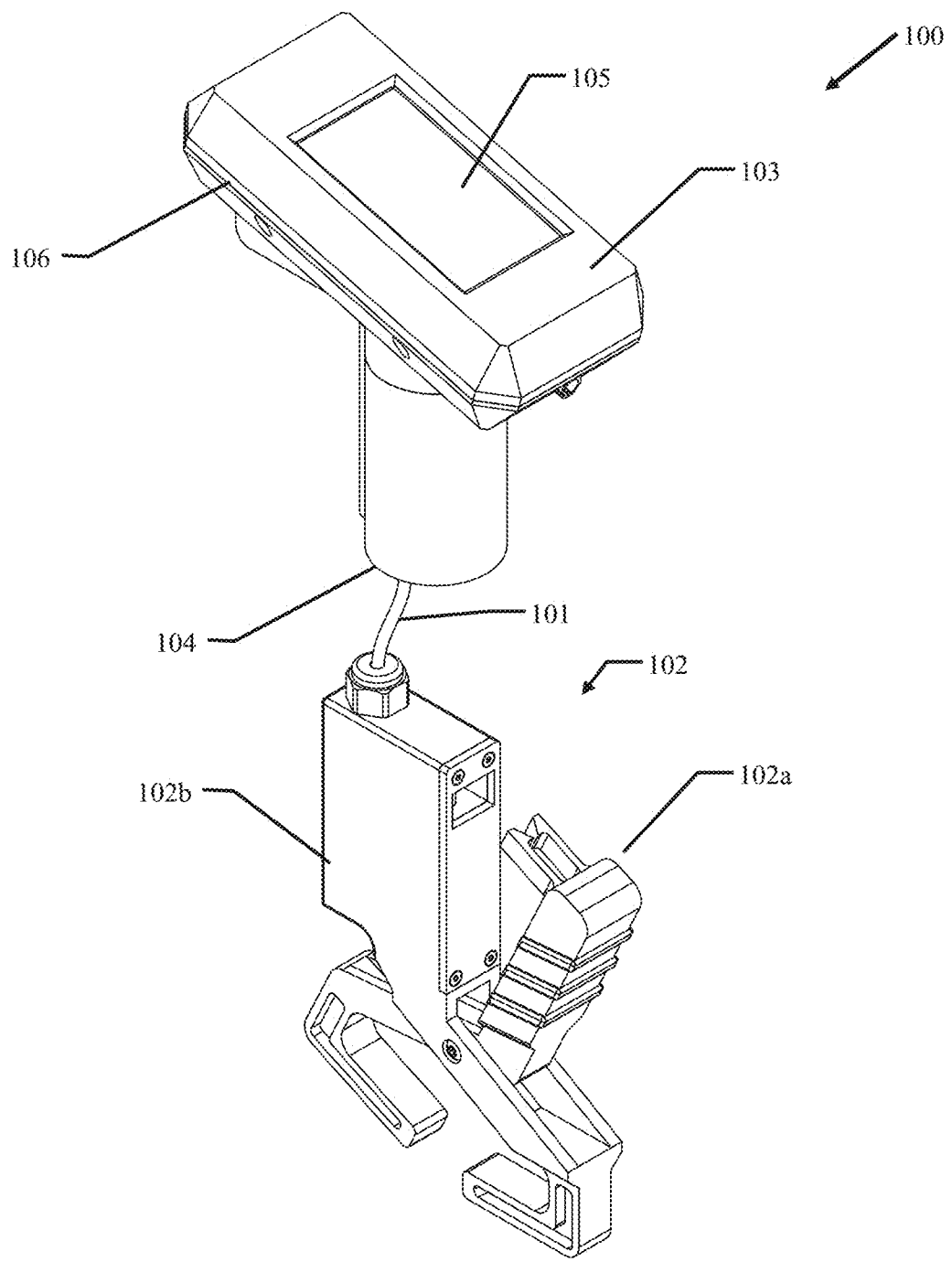
FIG. 1 displays an isometric view of an exemplary object weighing and release system, per embodiments herein.

Accurate weight and record keeping is advantageous for personal, competitive, and business means to form keepsakes, enact accountability measures, and efficiently collect data. Although hand scales, cameras, and locational sensors have been traditionally employed for such means, there exists a need for a seamless integrated a system configured for accuracy and fraud prevention.

Mismeasurement and tampering must be prevented in weight measurement and data collection to ensure quality accounting, competition, and quality assurance testing. Such advantages are obtained by the systems and methods herein through secure communications, tamperproof measuring systems, and specialized software.

The present disclosure pertains to a wireless scale, interface, and release system for recreational and commercial weighing of items of any kind in a uniform and secure manner. The item may comprise an animal, whereas the system is configured to weigh, document, and release the animal with minimal harm to the animal. Many such devices and methods currently implemented for competitive hunting and fishing require the use of bags, holding tanks, or other retaining means to transport such animals to immobile scales or await judge's review. Such systems however cause undue damage and pain towards the animal and are often inefficient and error prone.

The following is a detailed description of illustrative embodiments of the present disclosure. As these embodiments of the present disclosure are described with reference to the aforementioned drawings, various modifications or adaptations of the methods and or specific structures described may become apparent to those skilled in the art. All such modifications, adaptations, or variations that rely upon the teachings of the present disclosure, and through which these teachings have advanced the art, are considered to be within the spirit and scope of the present disclosure. For example, the devices set forth herein have been characterized herein for recreational and sporting events, but it is apparent that professional and training uses may also be found for these devices. Hence, these descriptions and drawings are not to be considered in a limiting sense as it is understood that the present disclosure is in no way limited to the embodiments illustrated.

While preferred embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure.

Mobile Systems for Weighing and Releasing Secured Content

Provided herein are object weighing and release systems. FIGS. 1-17 show exemplary embodiments of object weighing and release systems 100 comprising one or more of a scale 101, a release mechanism 102, an input device 103, a camera 104, a display 105, a mobile communication device, and a mobile processor.

The scale 101 may be configured to measure a weight of the object. The scale 101 may be configured to measure a weight of two or more objects. In some embodiments, the scale 101 comprises a strain gauge, a load cell, a transducer, a spring, or any combination thereof. The scale 101 may measure force by correlating the difference in resistance along a Wheatstone bridge.

The camera 104 may comprise an image camera, a video camera, a high speed camera, or any combination thereof. In some embodiments, the system 100 further comprises a gimbal, wherein the camera 104 is attached to gimbal, and wherein the gimbal is attached to the waterproof housing. In some embodiments, the gimbal is configured to translate the camera 104, rotate the camera 104, or both, with respect to the housing. In some embodiments, the mobile processor is in further in functional communication with the gimbal. In some embodiments, the system 100 further comprises a clock or timing mechanism in functional communication with the mobile processor.

In some embodiments, the system 100 further comprises at least one of a sensor and a light. In some embodiments, the sensor comprises a proximity sensor, a thermometer, GPS sensor, a light sensor, a microphone, an accelerometer, an inclinometer, a resistometer, a counter, a microphone, an RFID sensor, an ultrasonic sensor, a capacitive sensor, an inductive sensor, a magnetic sensor, a RADAR, a SONAR, a rain gauge, a wind gauge, an altimeter, or any combination thereof. In some embodiments, the system 100 further comprises an energy generation device. The energy generation device may comprise a solar cell, a thermal cell, a wind turbine, hydro-generator, manual electric generator, or any combination thereof. In some embodiments, the system 100 further comprises an energy storage device. The energy storage device may comprise a battery, a capacitor, a supercapacitor, a spring, or any combination thereof.

Figure 16:
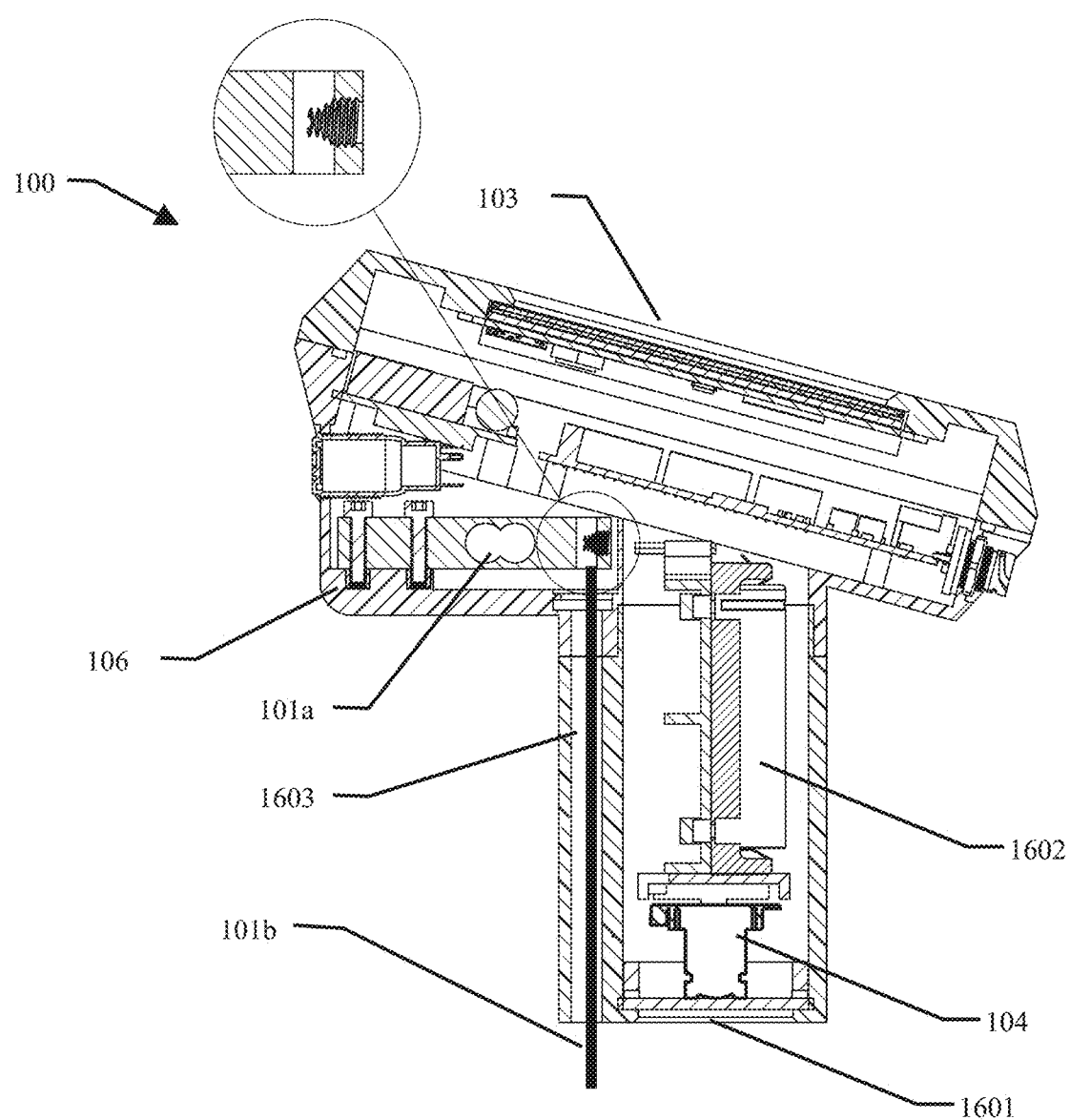
FIG. 16 shows a cross-sectioned view of the exemplary object weighing and release system of FIG. 1, per embodiments herein.

FIG. 16 shows a cross sectional view of an exemplary system 100 comprising the scale 101, the camera 104, a display 105, a lens 1601, and an energy storage device 1602. As seen the scale 101 may comprise a load cell 101a and a scale cable 101b. The housing 106 may comprise a vertical compartment 1603 to constrain the scale cable 101b.

Input Device and Display

Figure 12:
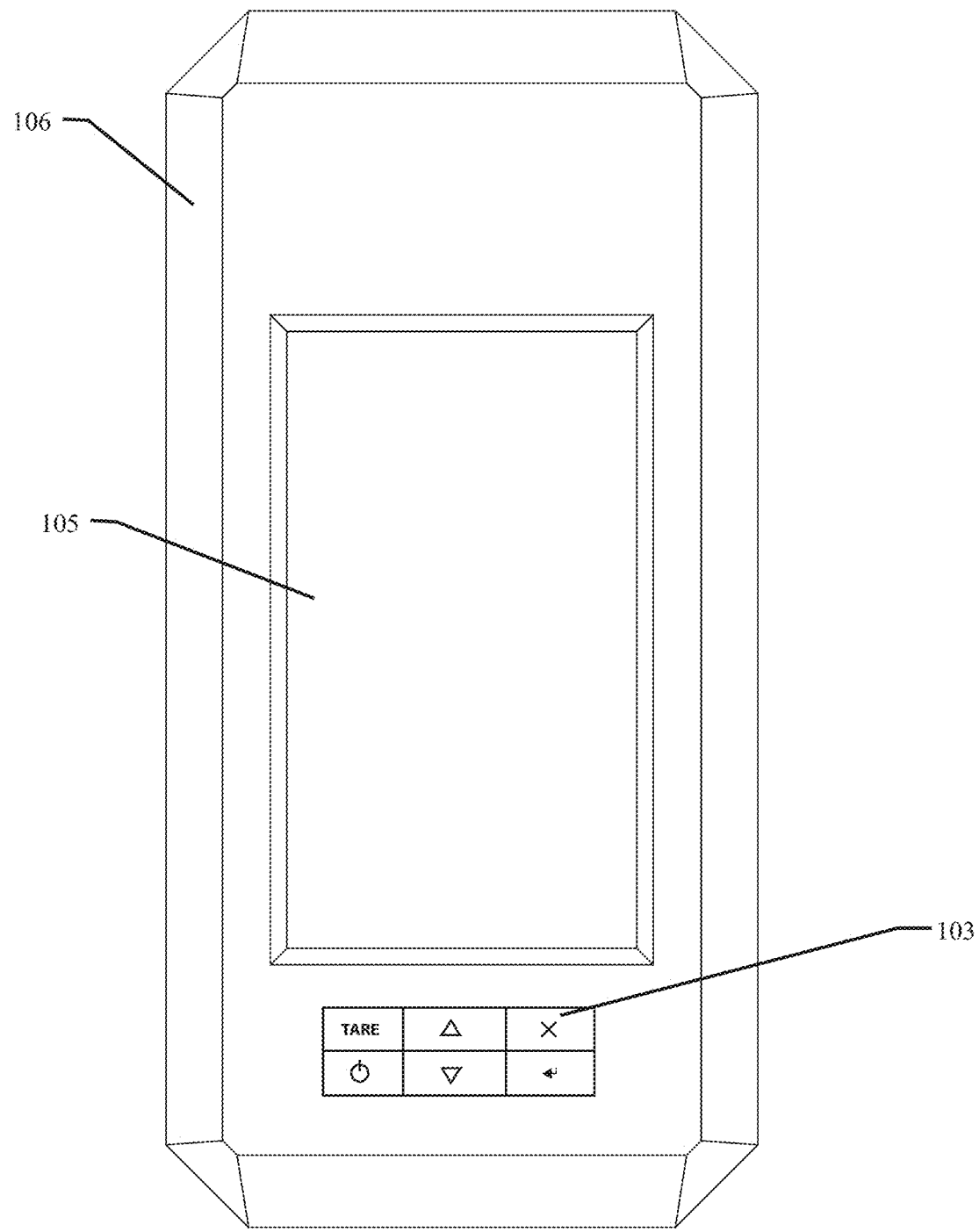
FIG. 12 shows a top view of the exemplary housing of FIG. 11, per embodiments herein.
Figure 13:
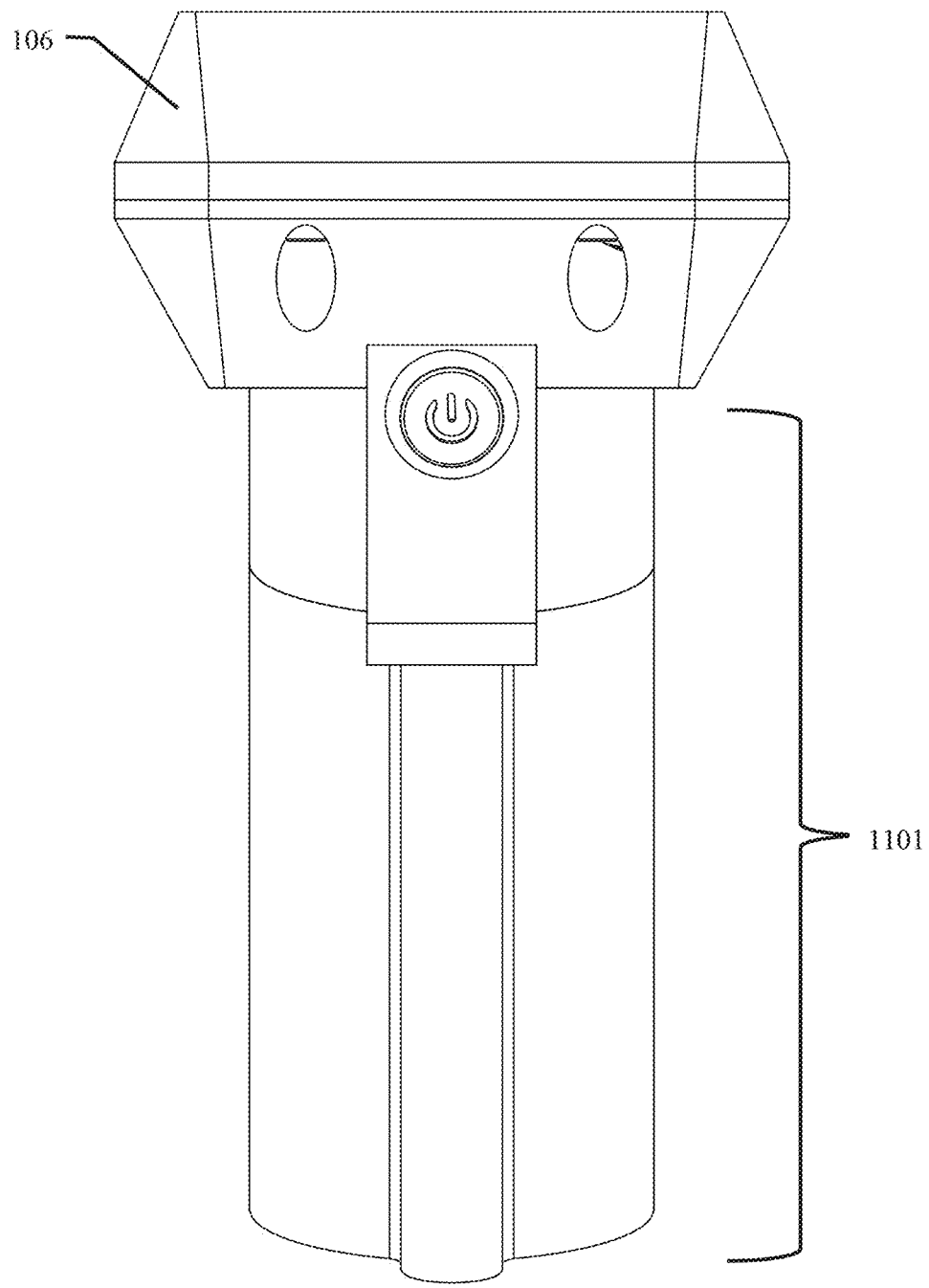
FIG. 13 shows a front view of the exemplary housing of FIG. 11, per embodiments herein.

The input device 103 may configured to receive an input. The system 100 may comprise 1, 2, 3, 4, 5, 6, 7, 8, 9, 10, or more inputs 103. The input device 103 may comprise a touchscreen, a button, a camera, a microphone, an input port, or any combination thereof. The input device 103 may comprise an a weight fish button, a directional button, a release button, a home button, a send weight button, a tare button, a yes button, a no button, a cancel button, a return or enter button, a resend button, a navigation button, or any combination thereof. In some embodiments, the input device 103 comprises two or more navigation buttons. A navigation button can be an arrow or directional button. An example of an input device 103 with a plurality of buttons is shown in FIG. 12.

The camera 104 may be configured to capture an image of the object, a surrounding of the object, or both. The system 100 may comprise 1, 2, 3, 4, 5, 6, 7, 8, 9, 10, or more cameras 104.

In some embodiments, the display 105 is configured to display the image, the weight, the input, or any combination thereof. The system 100 may comprise 1, 2, 3, 4, 5, 6, 7, 8, 9, 10, or more displays 105. In some embodiments, the display 105 comprises an LCD screen, an LED screen, a PDP display, an OLED display, a TFT display, or any combination thereof. In some embodiments, the display 105 and the input 103 comprise a single touch screen. The display 105 may comprise an anti-glare feature, an auto-turn off feature, or both.

Release Mechanism

Figure 2:
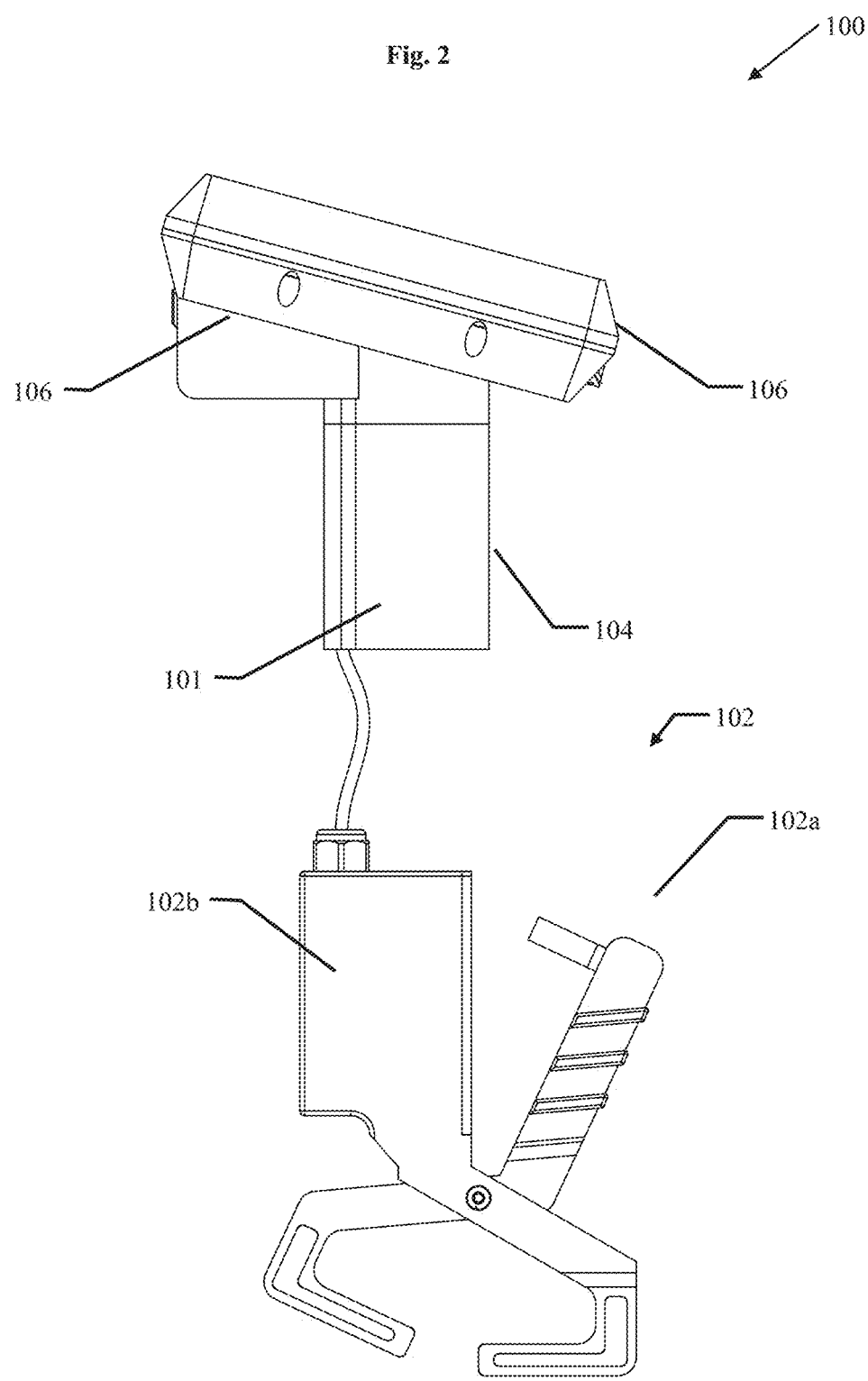
FIG. 2 displays a side view of an exemplary object weighing and release system, per embodiments herein.
Figure 3:
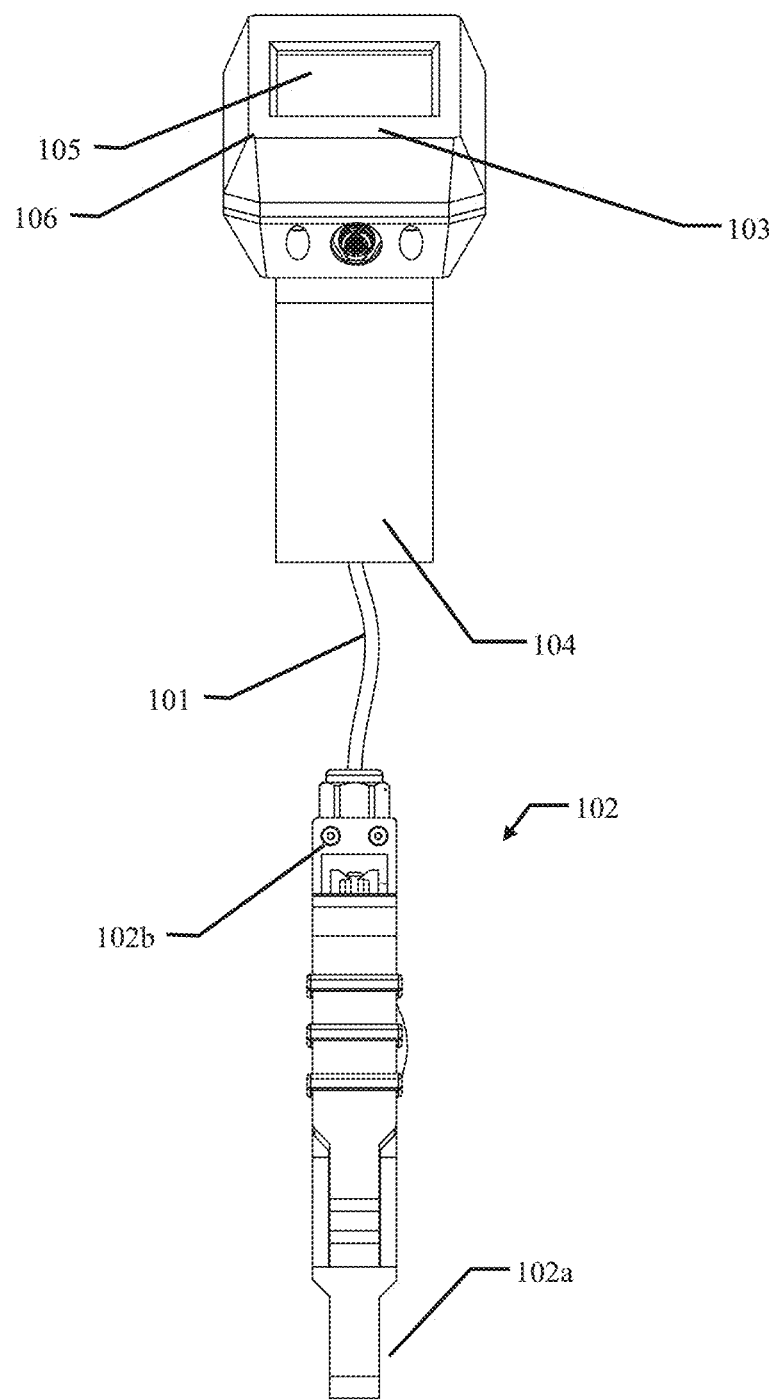
FIG. 3 displays a front view of the exemplary object weighing and release system of FIG. 1, per embodiments herein.

FIGS. 1-2 display that, per an intended orientation, the release mechanism 102 is configured to be suspended beneath the waterproof housing by the scale 101. In some embodiments, the release mechanism 102 is attached to the scale 101, and wherein the scale 101 is attached to the waterproof housing 106. The release mechanism 102 may be connected to the scale 101 by a cable. The cable may be flexible, comprise a strain relief, or both. The cable may be configured to transmit power, data, or both from the release mechanism 102 to the housing 106. The housing 106 may comprise a grommet, an O-ring, or any combination thereof to maintain water tightness at the point the cable enters the housing.

An exemplary embodiment of the release mechanism 102 is shown in FIGS. 4-10. The release mechanism 102 may comprise a first clamp arm 102a and a second clamp arm 102b. In some embodiments the first clamp arm 102a is permanently attached to the second clamp arm 102b. In some embodiments the first clamp arm 102a is permanently attached to and configured to rotate with respect to the second clamp arm 102b. In some embodiments the first clamp arm 102a is permanently attached to the second clamp arm 102b by a hinge 410. The hinge 410 may comprise a screw, a pin, a bearing, a washer, a slip ring, a spring, a torsional spring, or any combination thereof. The torsional spring may enable the first clamp arm 102a to rotate away from the second clamp arm 102b when the clamping mechanism 400a 400b is released. The torsional spring may enable a normally-open position of first clamp arm 102a and the second clamp arm 102b.

Figure 5:
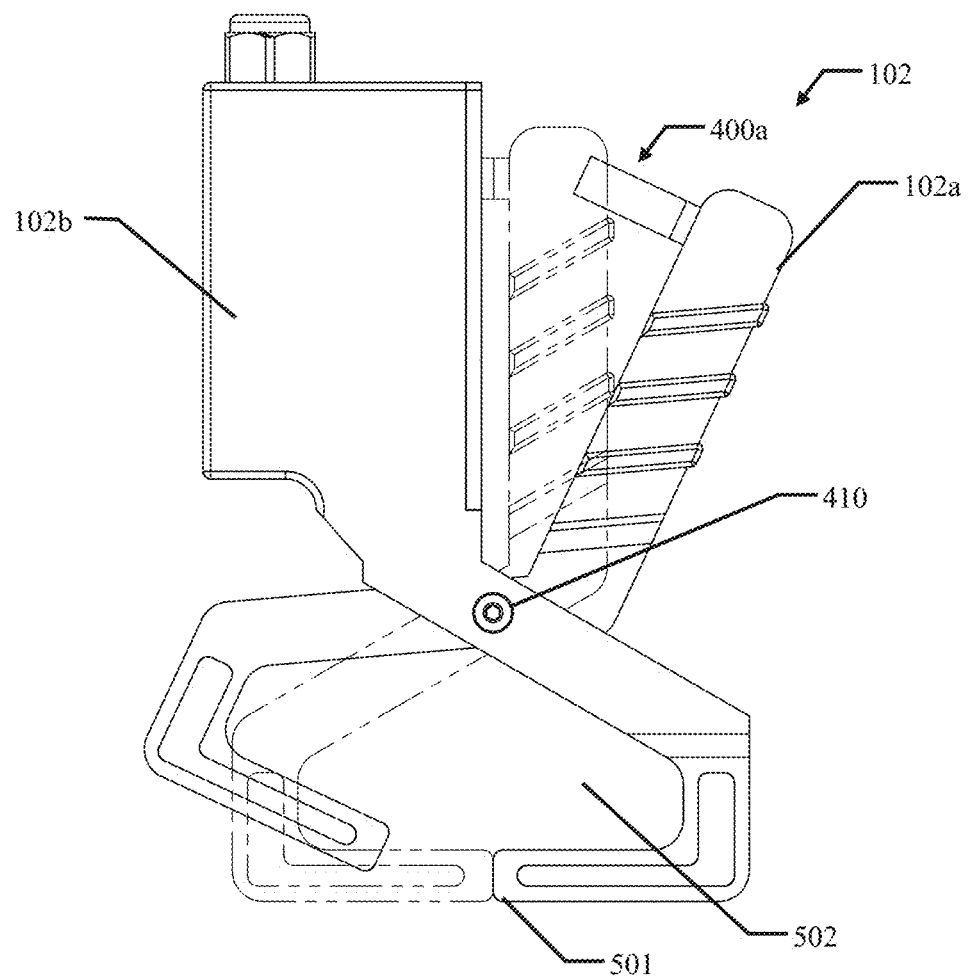
FIG. 5 displays an front view of the exemplary release mechanism of FIG. 4, per embodiments herein.
Figure 6:
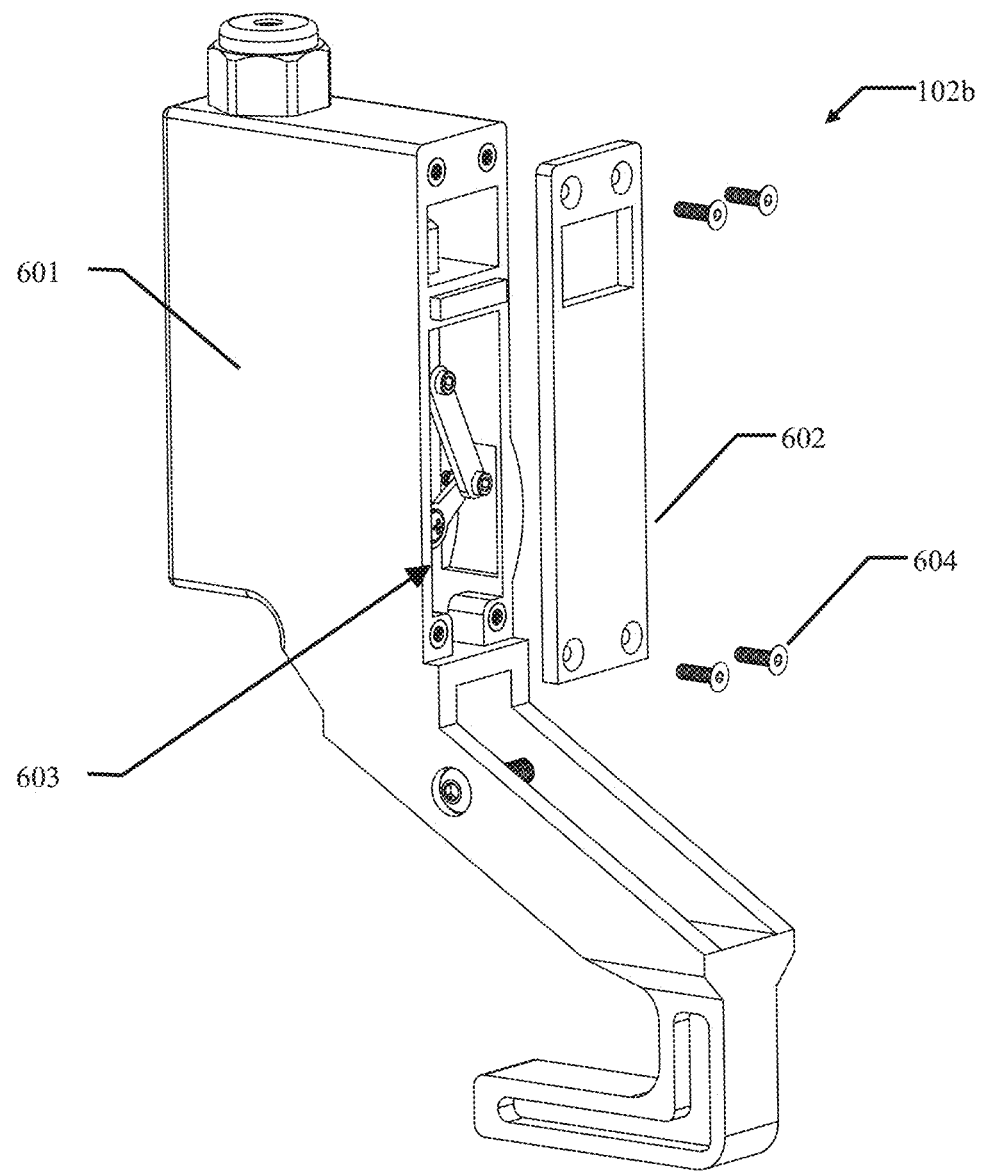
FIG. 6 displays an isometric exploded view of an exemplary second clamp of the release mechanism of FIG. 4, per embodiments herein.
Figure 7:
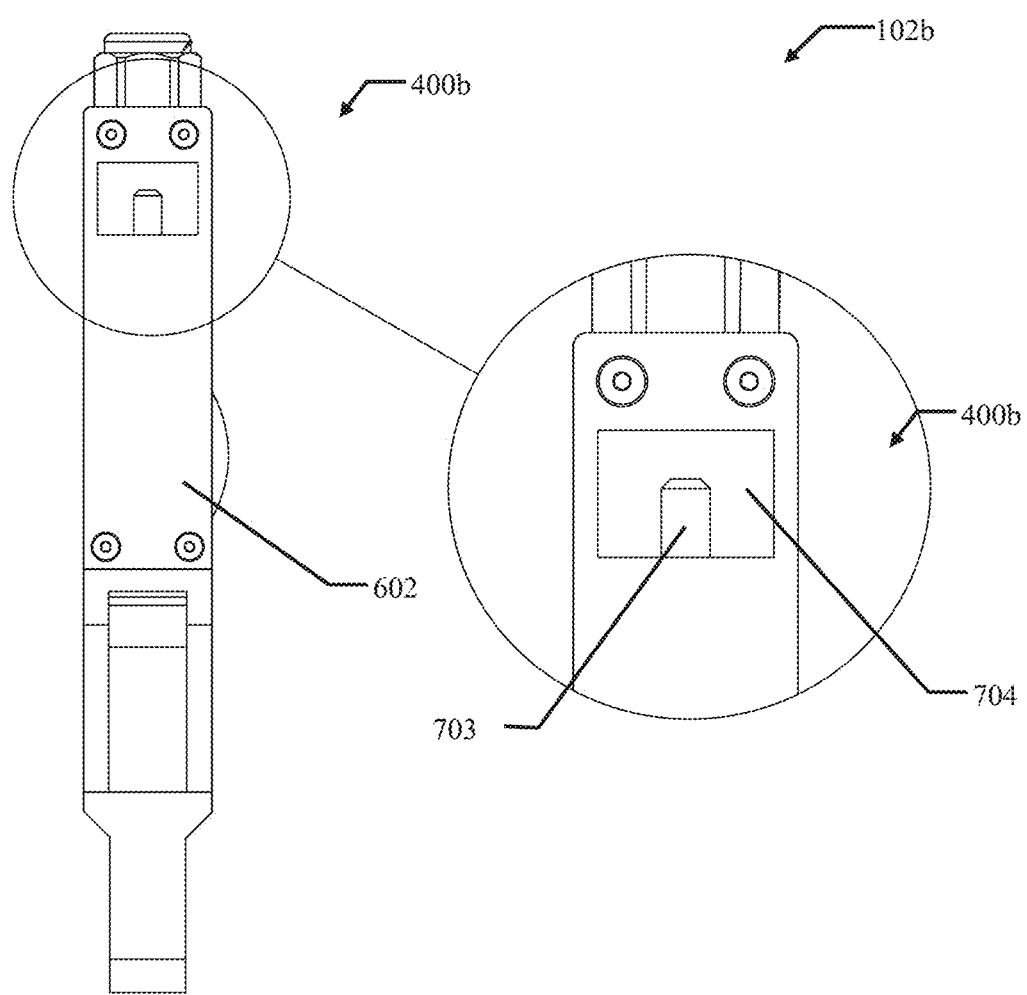
FIG. 7 displays a back view of an exemplary second clamp of the release mechanism of FIG. 4, per embodiments herein.
Figure 8:
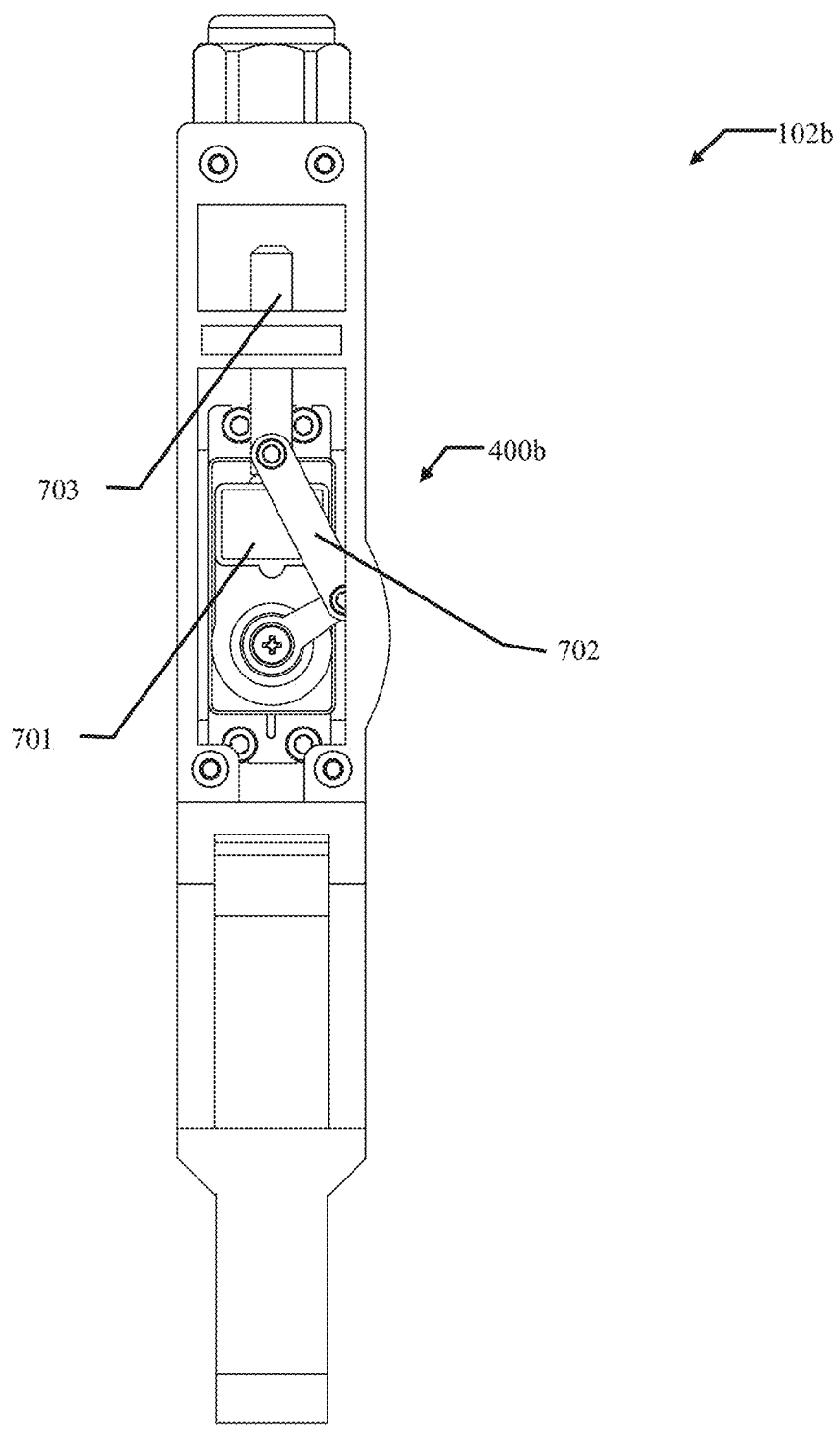
FIG. 8 displays another back view of an exemplary second clamp of the release mechanism of FIG. 4, per embodiments herein.

Per FIG. 5, the first clamp arm 102a may be configured to rotate with respect to the second clamp arm 102b from an open position to a closed position to clamp the object at a pinch point 501. In one example, to weight a fish, the first clamp arm 102a and the second clamp arm 102b are placed within and outside the mouth of the fish, respectively or non-respectively, wherein the mouth of the fish is securely grasped at the pinch point 501. The fish may be a live fish or a dead fish. Additionally, or alternatively, the first clamp arm 102a may be configured to rotate with respect to the second clamp arm 102b to form a clasp area 502. The clasp area 502 may be used to weigh an object by circumferentially clamping the object or a handle associated with the object.

The first clamp arm 102a may comprise a first clamping mechanism 400a, and the second clamp 102b may comprise a second clamping mechanism 400b. As seen, per FIG. 4, the first clamping mechanism 400a may comprise a male clamping mechanism, and the second clamping mechanism 400b may comprise a female clamping mechanism. Alternatively, the first clamping mechanism 400a comprises a female clamping mechanism, and the second clamping mechanism 400b may comprise a male clamping mechanism.

The clamping mechanism 400a 400b may be configured to engage and disengage the first clamp arm 102a from the second claim arm 102b. The clamping mechanism 400a 400b may be configured to engage and disengage the first clamp arm 102a from the second claim arm 102b to weigh and release the object. In some embodiments, the clamping mechanism comprises a motor, a solenoid, a magnet, a gear, a pulley, or any combination thereof.

In some embodiments, per FIGS. 6-10, the second clamp 102b comprises a clamp housing 601, and a cover plate 602 which seals and protects the second clamping mechanism 400b. The cover plate 602 may permanently or removably attach to the clamp housing 601. The cover plate 602 may permanently or removably attach to the clamp housing 601 by one or more clamp screws 604. At least one of the clamp housing 601 and the cover plate 602 may comprise a gasket or an O-ring.

The second clamping mechanism 400b may comprise a motor 701, a linkage 702, and a release pin 703. The motor 701 may drive the linkage 702 to translate the release pin 703 from an engagement position to a release position. The release pin 703 may be rotationally connected to the linkage 702. The motor 701 may comprise a servo motor, a brushless motor, a brush motor, a DC motor, an AC motor, or any combination thereof. The motor 701 may comprise a bidirectional motor. The motor 701 may driven by PWM pulse wave manipulation. The motor 701 may additionally or alternatively comprise a linear slider-crank mechanism, an elastic member, a linear drive, a linear actuator, a traveling-nut linear actuator, a worm drive, a lead screw, a cam, a ball screw, or any combination thereof. The linkage 702 may comprise a plurality of linkages 702. The release pin 703 in the release position may release or prevent engagement with the first clamping mechanism 400a. The release pin 703 in the engagement position may enable or initiate engagement with the first clamping mechanism 400a. In the release position, the release pin 703 may be entirely inside the clamp housing 601. The release pin 703 may be constrained to translate in a direction coincident with its axis of symmetry from the engagement position to the release position by a slot within the clamp housing 601. The slot within the clamp housing 601 may further absorb any lateral forces on the release pin 703. The release pin 703 may be surrounded by a gasket or an O-ring to prevent leakage. The release pin 703 may reside in a recess 704 configured to accept the first release mechanism 400a.

Figure 4:
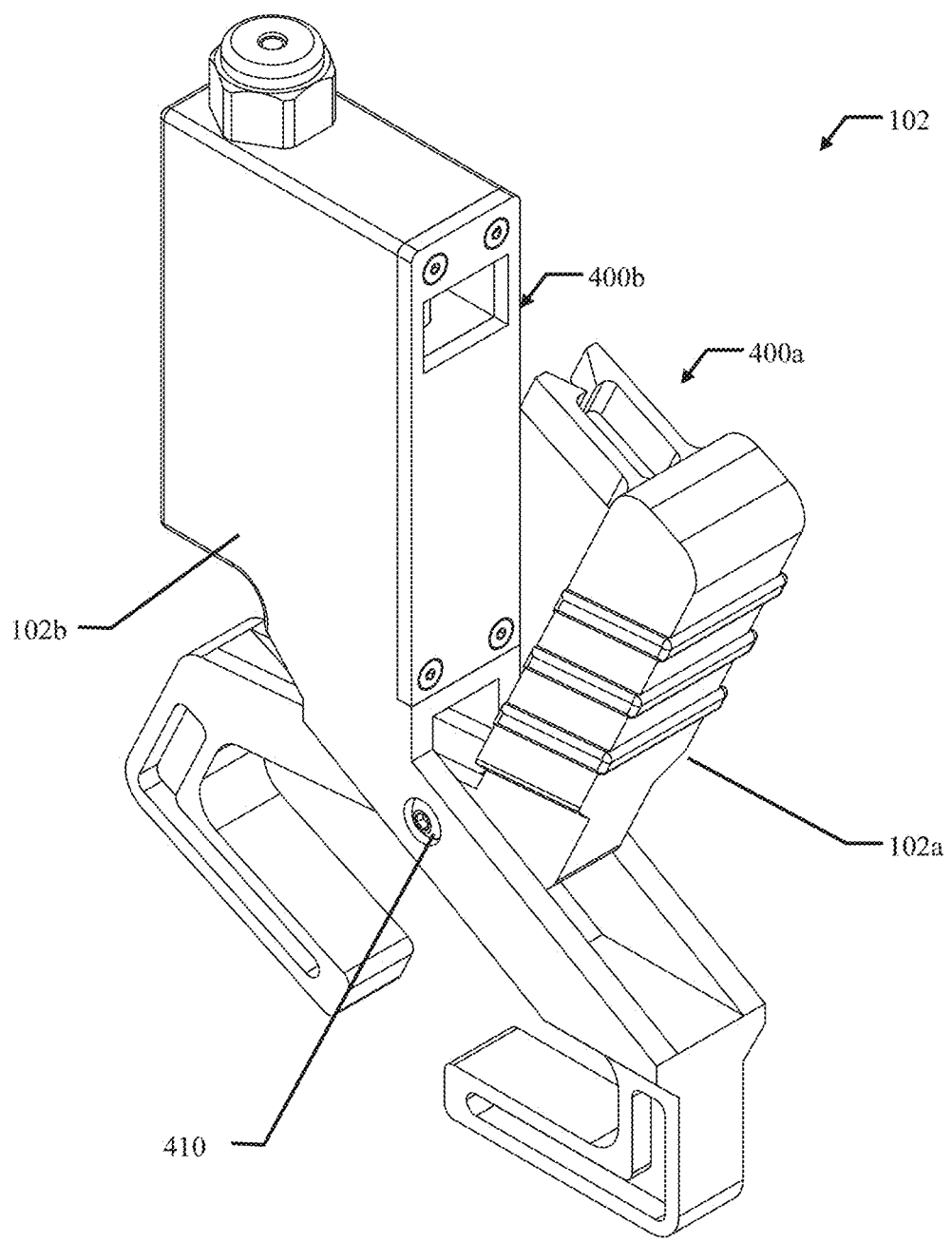
FIG. 4 displays an isometric view of an exemplary release mechanism, of the exemplary object weighing and release system of FIG. 1, per embodiments herein.
Figure 9:
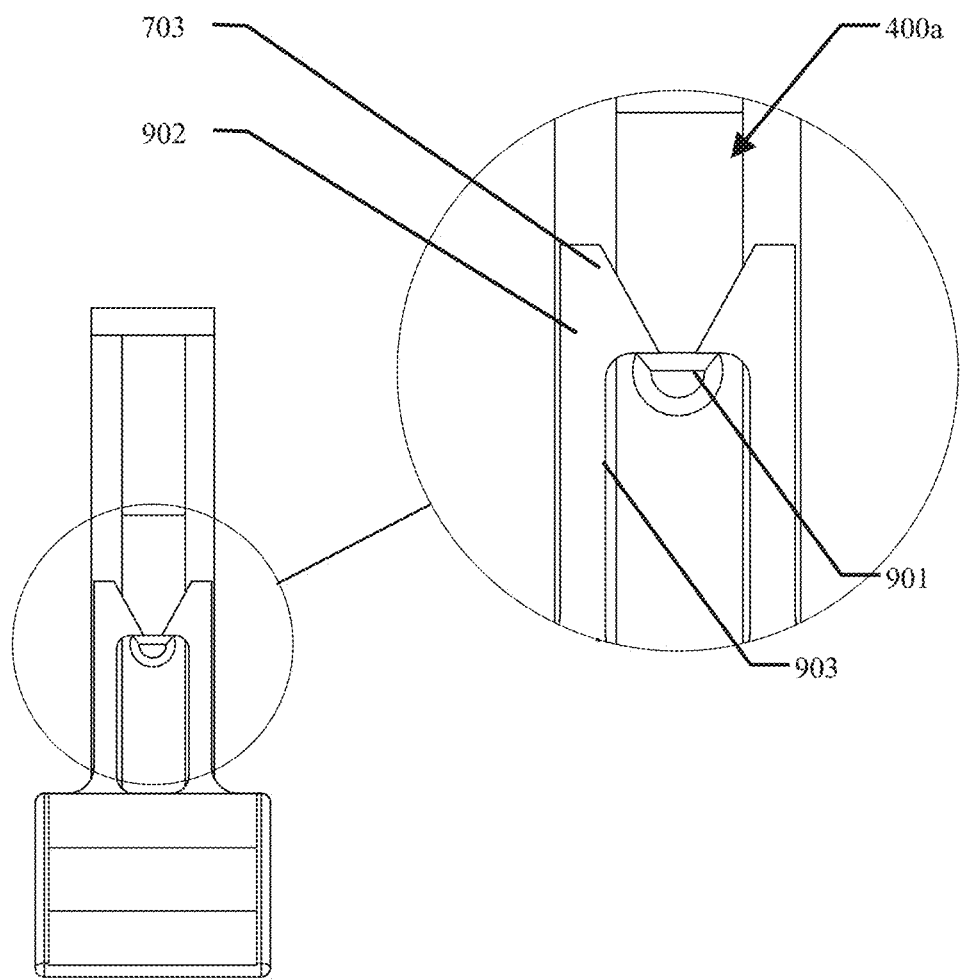
FIG. 9 displays a detailed view of an exemplary release mechanism of FIG. 4, per embodiments herein.
Figure 10:
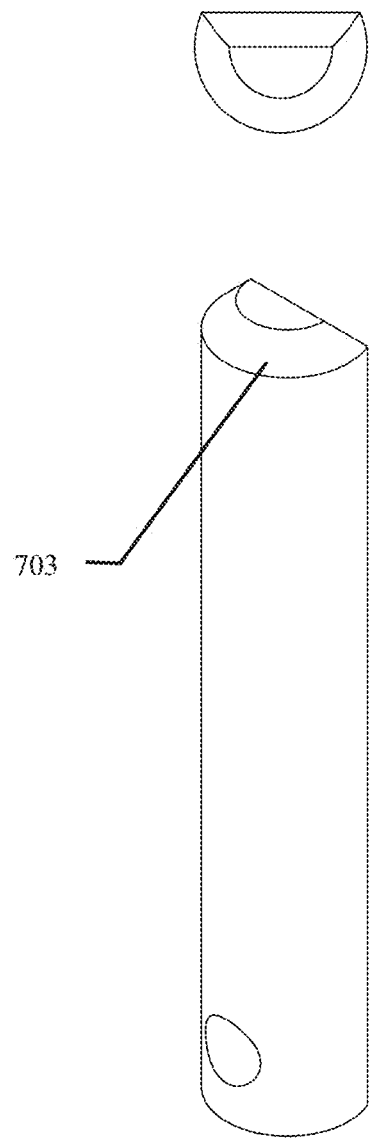
FIG. 10 displays an exemplary release pin of the clamping mechanism of the release mechanism of FIG. 4, per embodiments herein.

Per FIGS. 4 and 9, the first clamping mechanism 400a may comprise a snap comprising a cavity 401 configured to receive the release pin 703. The snap may be configured to engage with the release pin 703 in its engagement position, or as it is translating to its engagement position. The snap may comprise a first snap protrusion 901 and a second snap protrusion 902. The first snap protrusion 901 and the second snap protrusion 902 may be mirror equivalents. The first snap protrusion 901 and the second snap protrusion 902 may be configured to flex apart from one another to allow transverse entrance of the release pin 703. The first snap protrusion 901 and the second snap protrusion 902 may have a chamfered leading edge and a flattened opposing edge to allow and prevent transverse insertion of the release pin 703, respectively. The first snap protrusion 901 and the second snap protrusion 902 may form a cavity 903 for capturing the release pin 703. An exemplary release pin is shown in FIG. 10.

Waterproof Housing

In some embodiments, per FIGS. 1-3 and 11-15, the system 100 further comprises a waterproof housing 106. In some embodiments, at least one of the camera 104, the scale 101, the release mechanism 102, the input device 103, the display 105, the sensor, the mobile communication device, and the mobile processor are within the waterproof housing, attached to the waterproof housing, or within and attached to the waterproof housing. In some embodiments, at least one of the camera 104, the scale 101, the release mechanism 102, the input device 103, the display 105, the sensor, the mobile communication device, and the mobile processor are outside the waterproof housing, detached from the waterproof housing, or both. In some embodiments, the waterproof housing further contains an energy storage device. In some embodiments, the waterproof housing comprises at least one of an anti-tampering mechanism, and a unique identification marker. In some embodiments, the anti-tampering mechanism comprises a lock, a fingerprint reader, an iris scanner, communication encryption, password software, or any combination thereof. In some embodiments, the unique identification mark comprises an alphanumeric identification, a numeric identification number, a QR code, a barcode, an RFID tag, or any combination thereof. In some embodiments, the waterproof housing further contains a lens configured to cover and protect the camera 104.

Figure 11:
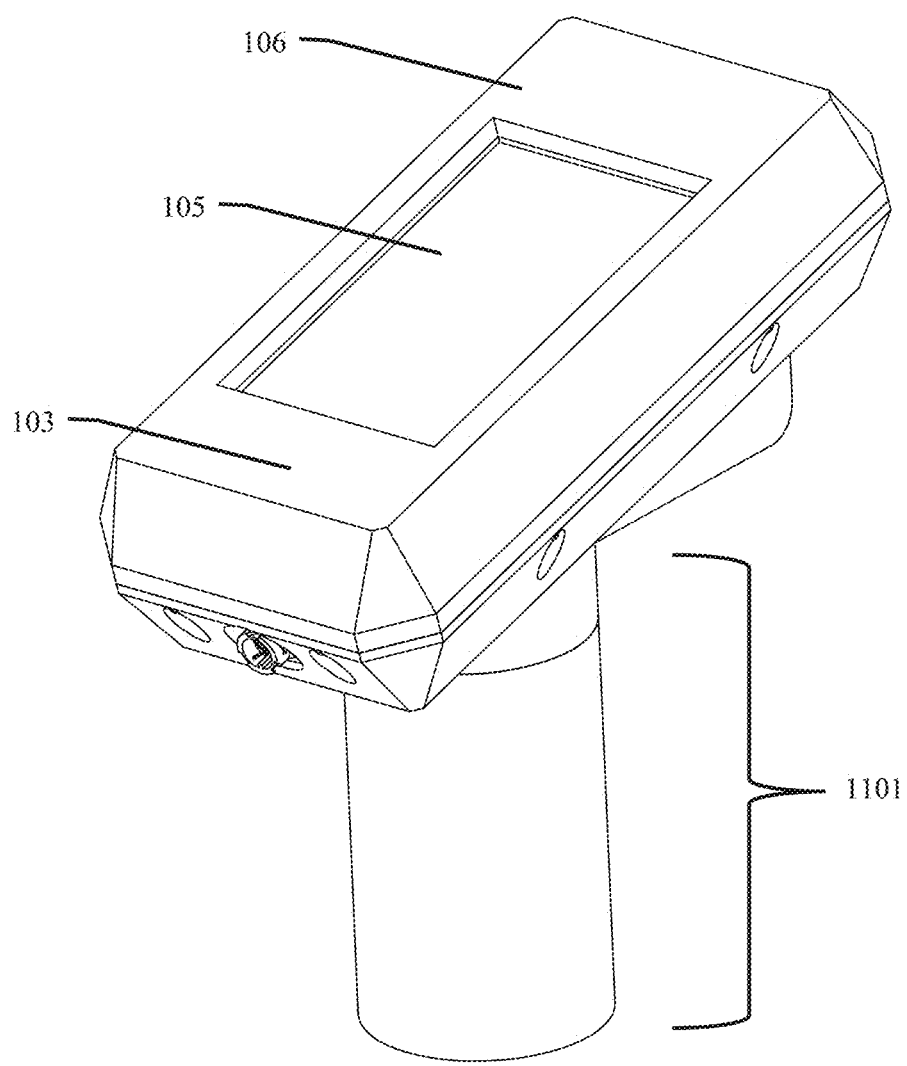
FIG. 11 shows an isometric view of an exemplary housing of the exemplary object weighing and release system of FIG. 1, per embodiments herein.
Figure 17:
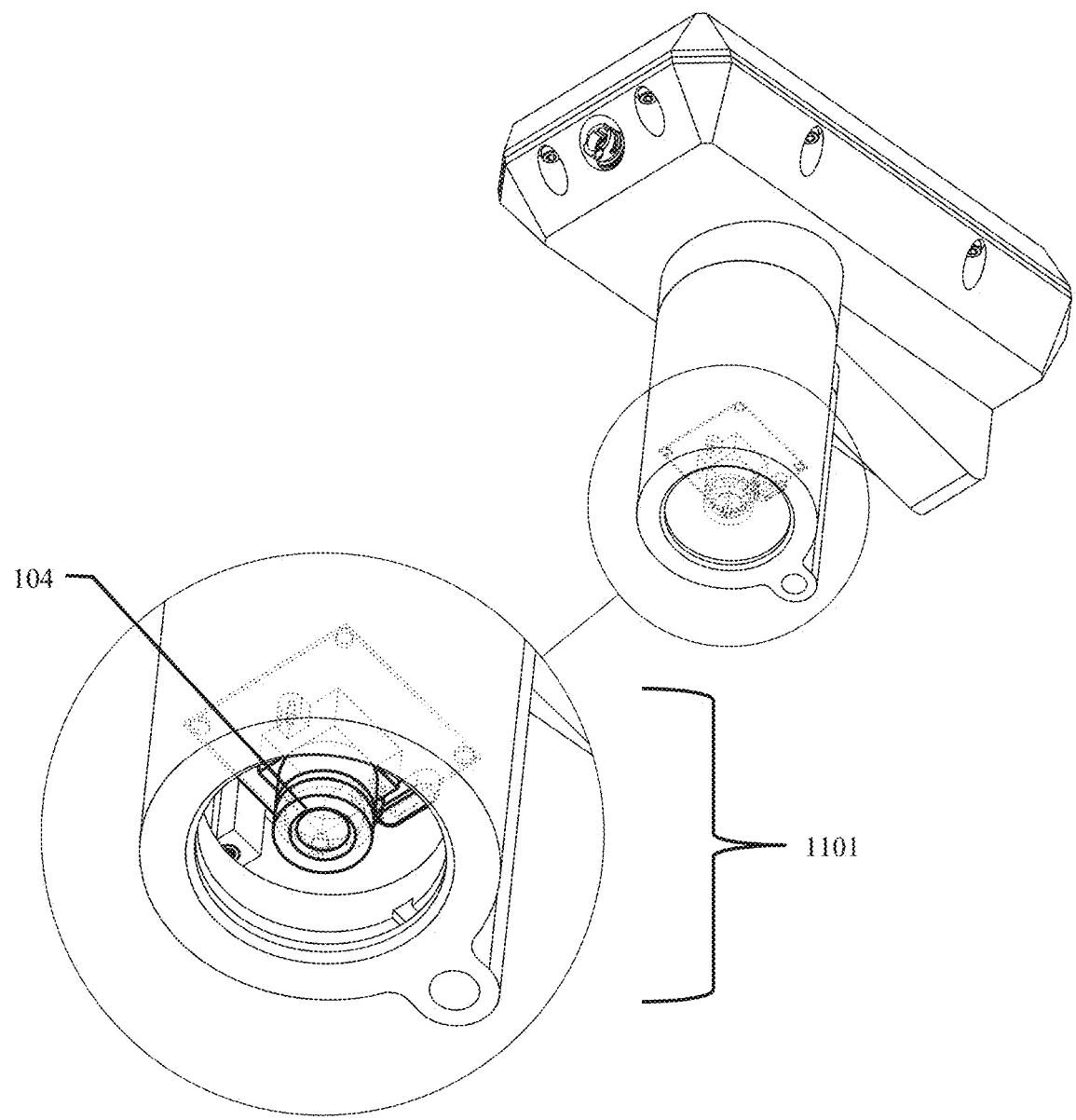
FIG. 17 shows a bottom perspective view of the exemplary object weighing and release system of FIG. 1, per embodiments herein.

In some embodiments, per FIG. 11, the waterproof housing 106 comprises a bottom portion 1101. The bottom portion 1101 may be configured to be held by a user. As seen in FIG. 17, the bottom portion 1101 may comprise the camera 106.

Figure 14:
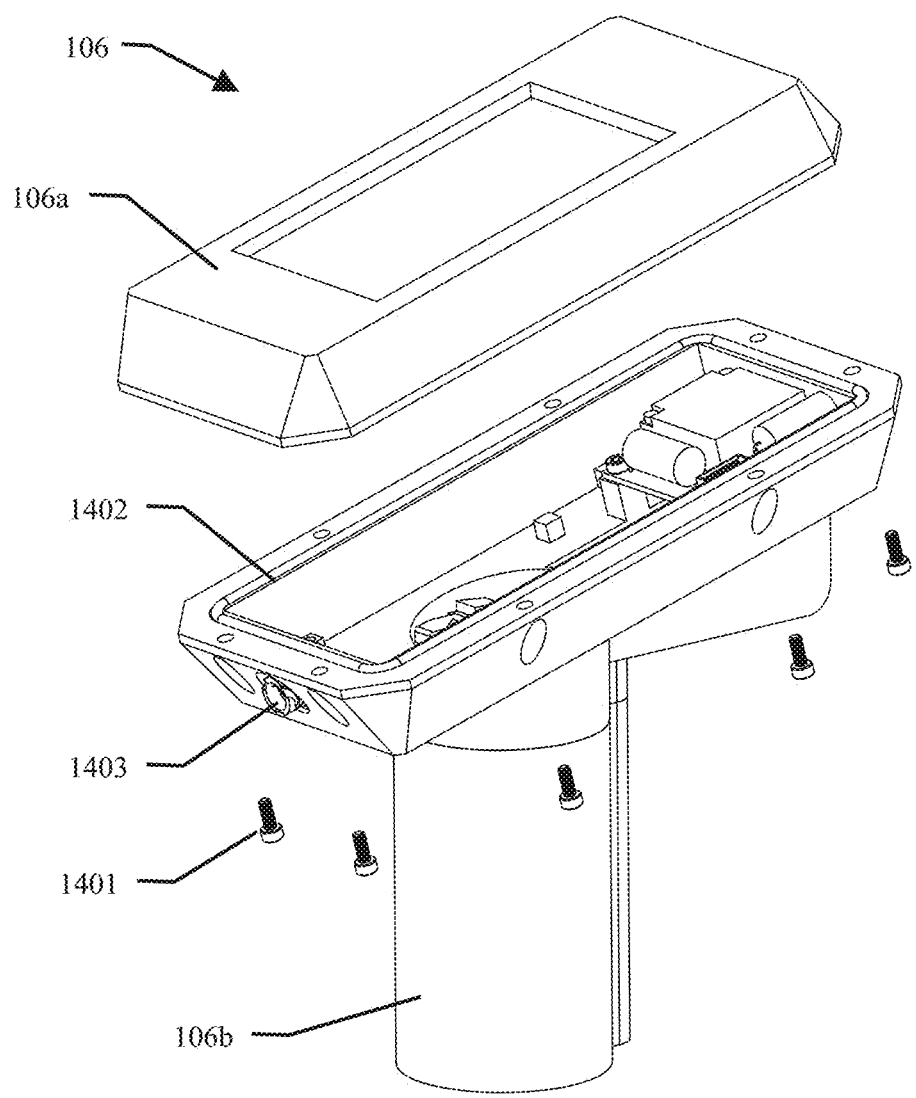
FIG. 14 shows an exploded perspective view of the exemplary housing of FIG. 11, per embodiments herein.
Figure 15:
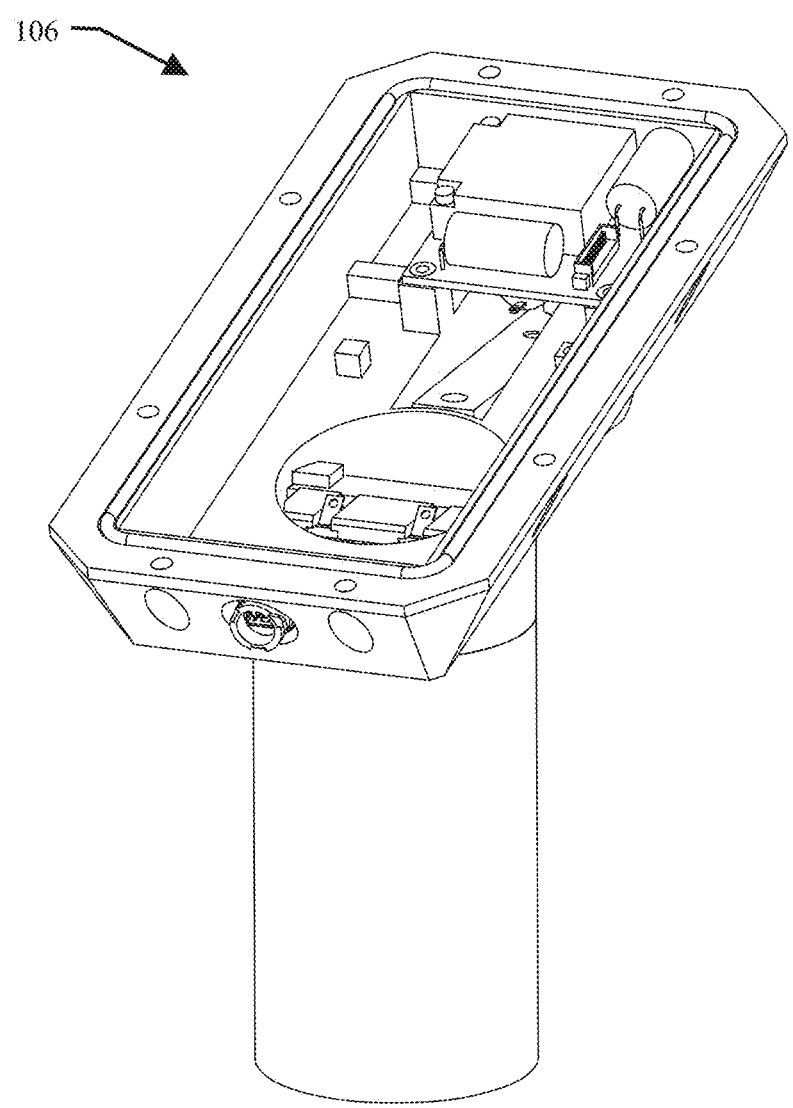
FIG. 15 shows an open perspective view of the exemplary housing of FIG. 11, per embodiments herein.

As seen in FIG. 14, the housing 106 may comprise an upper housing 106a and a lower housing 106b. The upper housing 106a and the lower housing 106b may be permanently or removably attached. The upper housing 106a and the lower housing 106b may be permanently or removably attached by a plurality of screws 1401. The a plurality of screws 1401 may ensure that the housing 106 is watertight and sealed. The plurality of screws 1401 may comprise 2, 3, 4, 5, 6, 7, 8, 9, 10, 15, 20, or more screws. Per FIG. 14, the housing 106 may further comprise an O-ring 1402, a gasket, or both. The housing may further comprise a charging port 1403. The charging port 1403 may comprise a waterproof charging port 1403. The charging port 1403 may be located on the front of the housing 106. The lower housing 106b may comprise the energy storage device for improved handheld stability. In some embodiments, the charging port 1403 may comprise a memory card port. In some embodiments, the plurality of screws 1401 may be replaced with a locking plastic tab, a welded seam, a press fitting, an adhesive or any combination thereof.

Mobile Communication Device

The mobile communication device may be configured to transmit the image, the weight, the input, or any combination thereof. The mobile communication device may be configured to receive a base sensed data, an instruction, or both from the base station. In some embodiments, the mobile communication device comprises a Wi-Fi device, a cellular device, a Bluetooth device, a satellite mobile communication device, a radio device, a LoRa device, a WLAN device, a microwave communication device, or any combination thereof. The mobile communication device may comprise a long range communication device, or a short range communication device. The mobile communication device may comprise a mesh communication device. The mesh communication device may be configured to receive and send data to a plurality of other systems.

The mobile processor may be in functional communication with, the scale 101, the release mechanism 102, the input device 103, the camera 104, the display 105, and the mobile communication device. The mobile processor may be in continual or periodic communication with, the scale 101, the release mechanism 102, the input device 103, the camera 104, the display 105, and the mobile communication device.

In some embodiments, the mobile processor in functional communication with the camera 104 is configured to adjust a camera setting. The camera 104 setting may comprise a number of pixels, an aperture size, an exposure rate, a frame rate, a color tint, or any combination thereof. The mobile processor may adjust a camera setting by actuating an actuator that engages with a button of the camera 104. The mobile processor may adjust a camera setting by sending a wired or wireless instruction to the camera 104. The mobile communication device may be configured to transmit a time data associated with a time that the image is captured.

Object Weighing and Release Application

In some embodiments, the mobile processor is configured to provide a mobile application comprising: a software module receiving the input and the weight of the object; a software module disengaging the release mechanism; a software module directing the camera to capture the image, receive the image, or both; a software module engaging the release mechanism; and a software module directing the display, the mobile communication device, or both.

The software module may direct the display, the mobile communication device, or both based on the input, the engagement of the release mechanism, the disengagement of the release mechanism, the weight of the object, the image, or any combination thereof.

In some embodiments, the software module directs the mobile communication device to transmit at least one of the engagement of the release mechanism, the disengagement of the release mechanism, the weight of the object, the input, and the image. In some embodiments, the software module directs the mobile communication device to transmit at least one of the engagement of the release mechanism, the disengagement of the release mechanism, the weight of the object, the input, and the image based on the input, the sensed data, or both. The software module may record a time at which an image is captured. The software module may further append the time to the image. The software module may instruct the communication device to transmit the image and the time.

In some embodiments, the mobile application further comprises a software module recording a tare weight. The tare weight may be based on a recorded input and the scale measurement. The tare weight may be based on a recorded input and the scale measurement recorded while the release mechanism is disengaged.

In some embodiments, the mobile application further comprises a software module receiving a base sensed data from a base sensor. In some embodiments, the mobile application further comprises a software module applying an image processing algorithm to one or more of the weight of the object, the input, and the image. The image processing algorithm may determine a volume, length, width, thickness species or any combination thereof of the item. In some embodiments, the image processing algorithm comprises an artificial intelligence image processing algorithm. In some embodiments, the image processing algorithm comprises a rule based algorithm.

Figure 23:
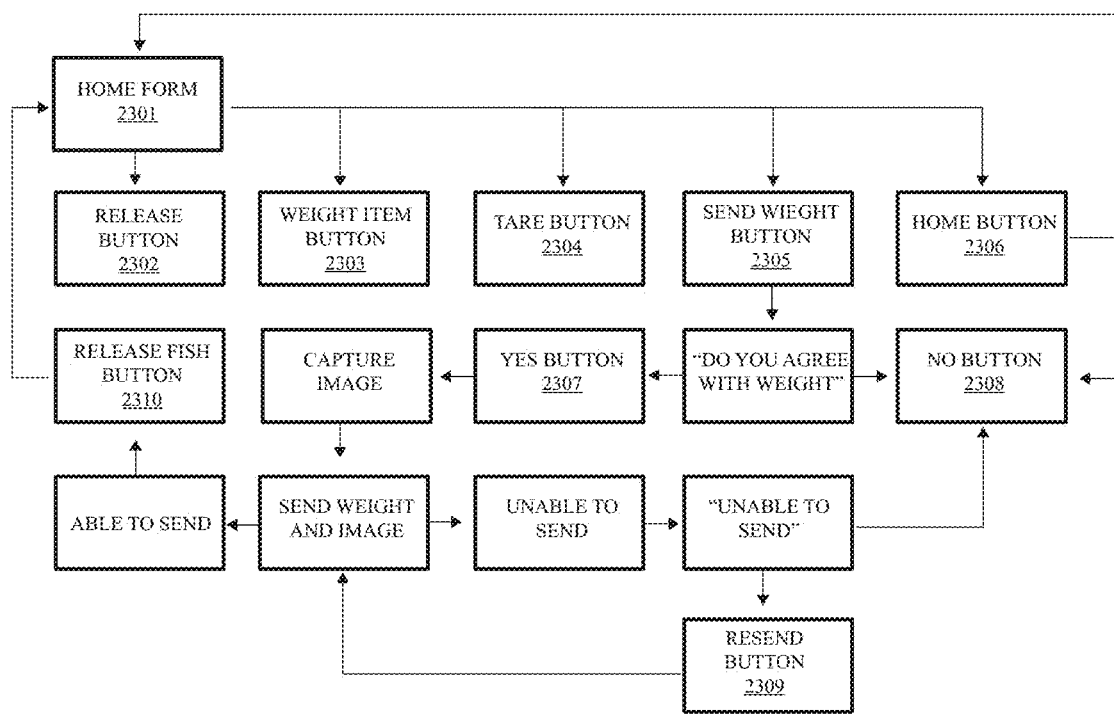
FIG. 23 shows a diagram of an exemplary object weighing and release application.
Figure 23A:
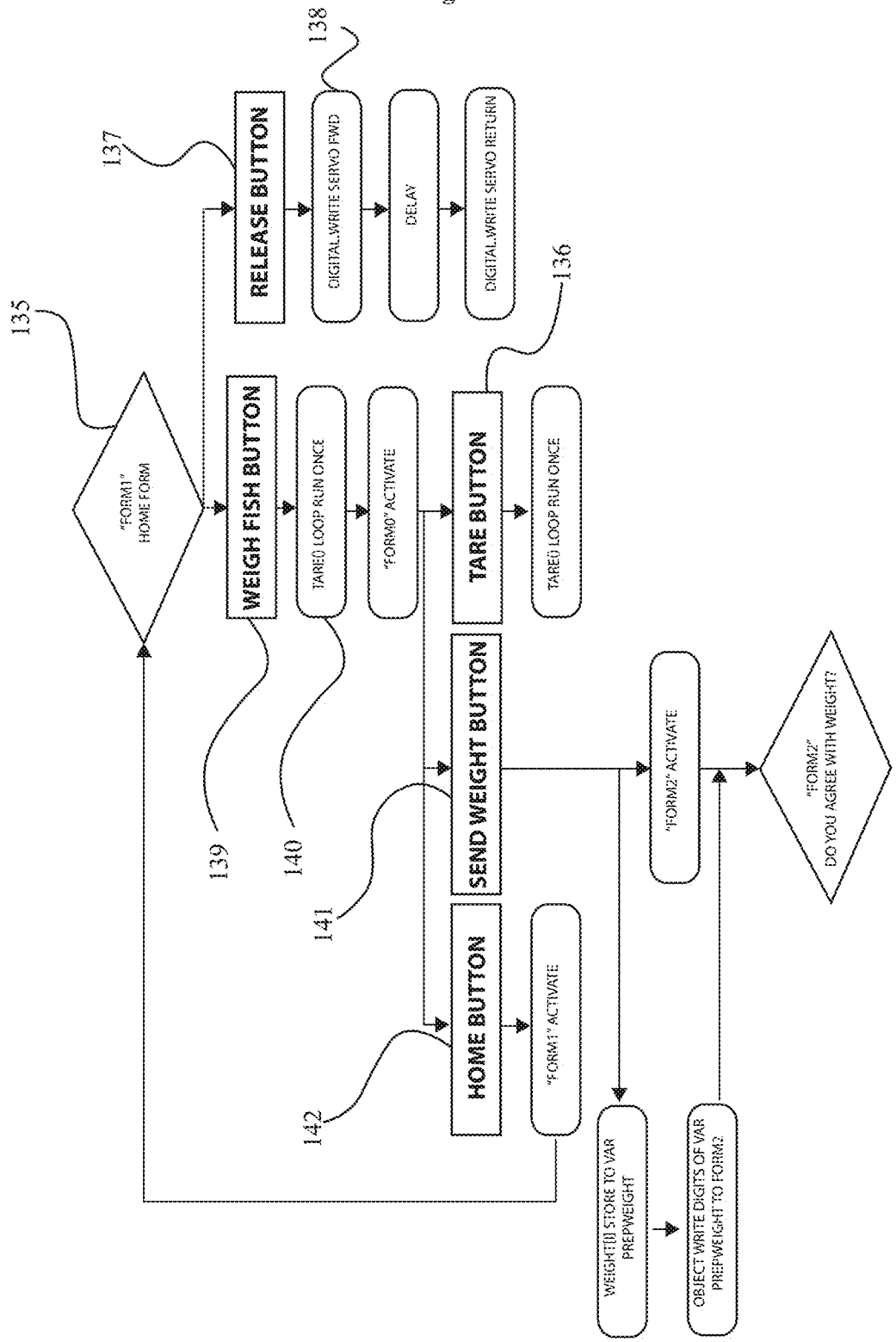
Figure 23B:
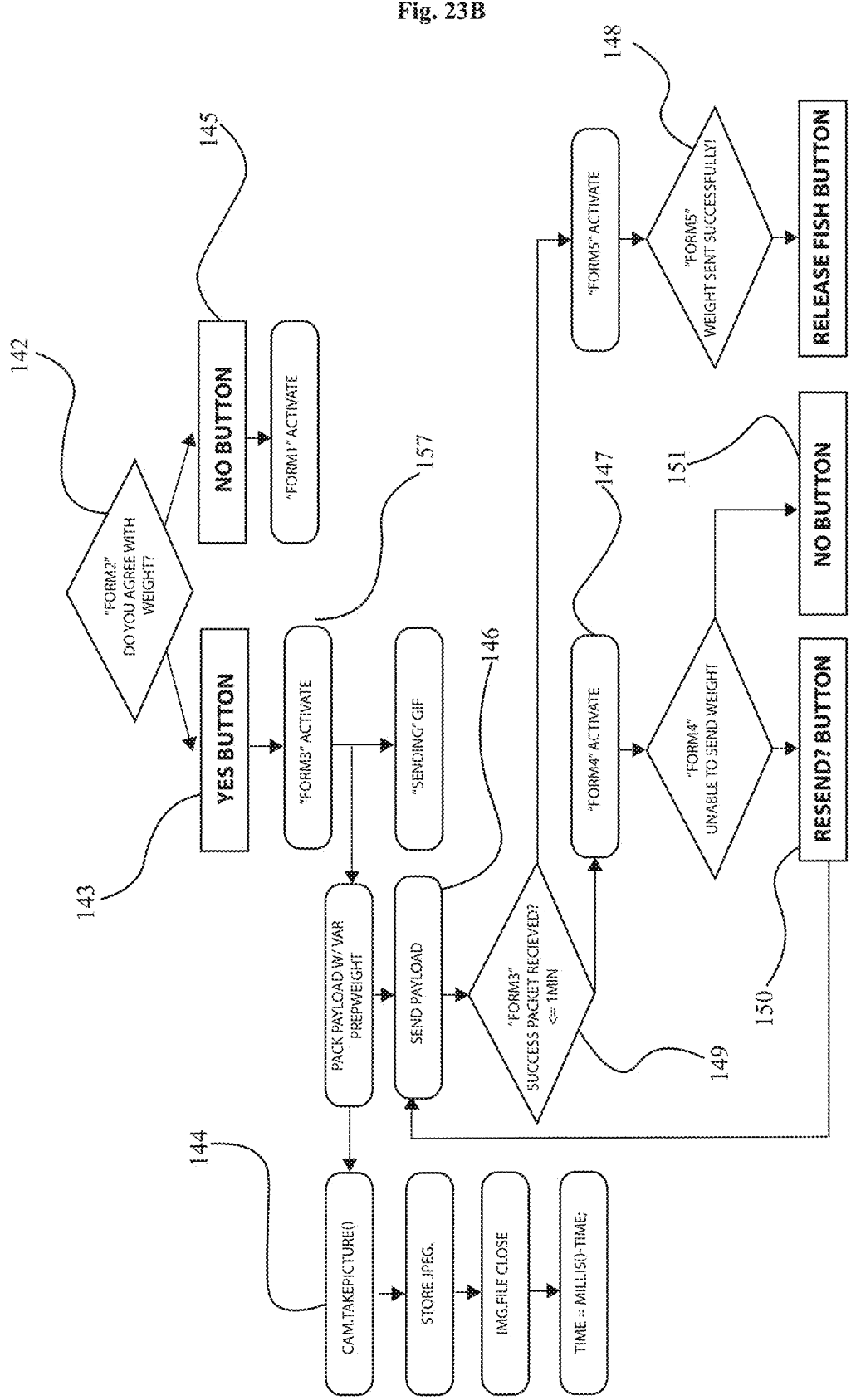
Figure 23C:
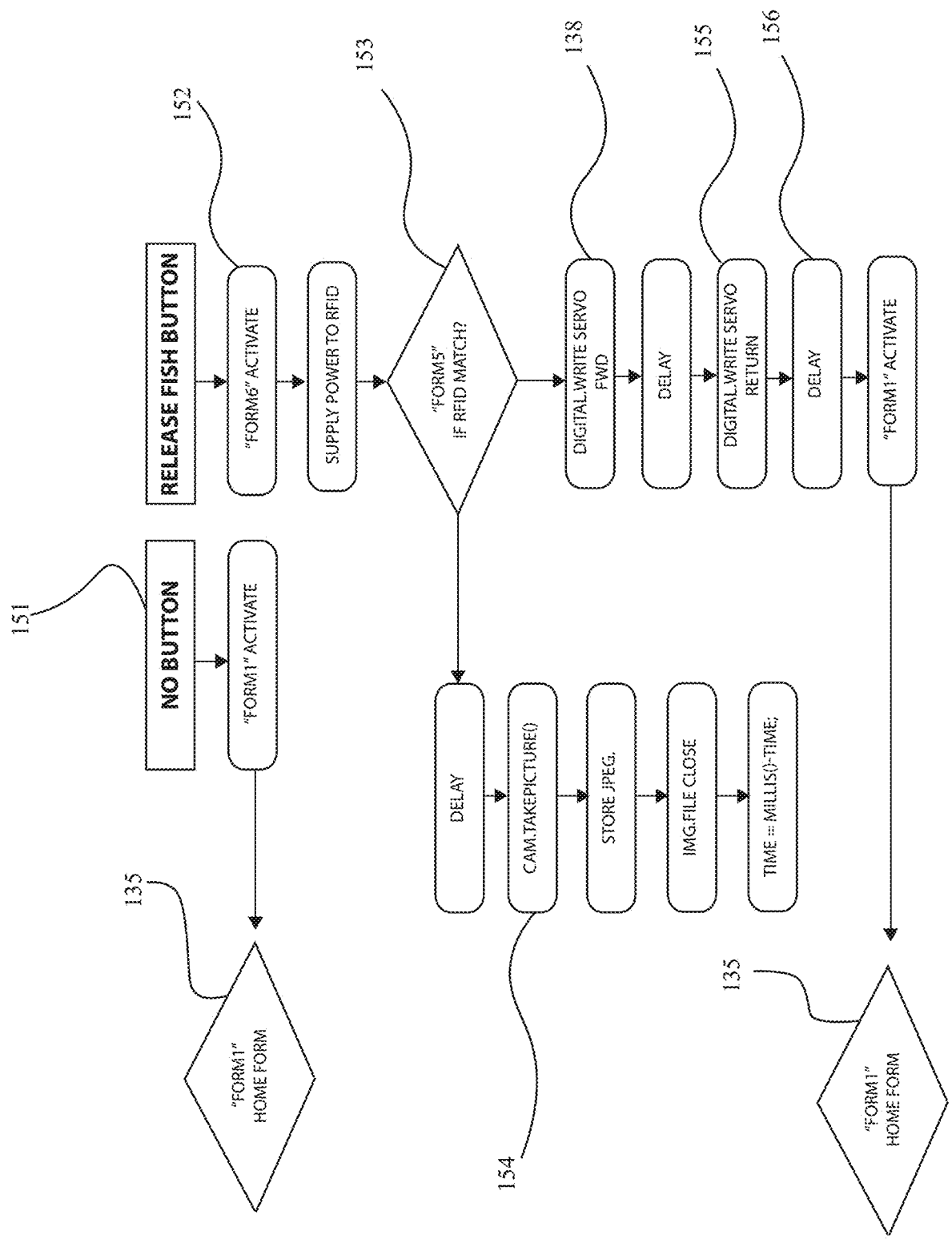

Exemplary mobile application flowcharts are shown in FIGS. 23-24. Per FIG. 23, from a home form 2301, a user may press the release button 2302, the weight fish button 2303, the tare button 2304, the send weight button 2305, or the home button 2306. If the user presses the home button 2306, the display returns to the home form 2301. If the user presses the send weight button 2305 the system submits a prompt of "do you agree with this weight". If the user presses a no button 2308 to not agree, the user is sent back to the home form 2301. If the user presses the yes button 2307, an image of the item is captured and the system sends or stores the image and/or the sensor data. If the image is successfully sent, the user is allowed to press the release fish button 2310, after which the user is returned to the home form 2301. If the image is not successfully sent, the system displays an error that it was "unable to send". The user may then press the no button 2308 to return to the home form 2301 or press a resend button 2309.

Per FIG. 24, the user is first directed to a form 1 home form 135, whereas after pressing a release button 138, the application performs a digital.write Servo FWD command 138 and then a digital.write servo return, after a delay. Alternatively if the user presses a weight fish button 139, the application performs a tare( ) loop run once, whereafter Form( ) is activated. Thereafter the user can press a tare button 136 to again perform the tare( ) loop run once function. The user can alternatively press the home button 142, whereby form 1 activates to return the user to the home form 135, or the user can press the send weight button 141, whereafter form 2 activates, weight[i] is stored to var prepweight, the object writes digits of var prepweight to form 2, and form 2 displays the indication "Do you agree with weight?" 142. If the user presses the no button 145 Form 1 activates and the user is returned to the home form. If the user presses the yes button 143, form 3 activates, sending GIF is enabled, the application packs payload with var prepweight, enables the cam.takepicture( ) function 144, stores the JPEG, and opens the commands img.file close and time=millis( )-time. The send payload function 146 is enabled and if form 3 success packet received within 1 minute 149, form 5 activates and displays that the "weight sent successfully," whereby the user can press the release fish button. Thereafter form 6 152 is activated, the application is commanded to supply power to ID-12A and form 5 confirms if the RFID is a match 153. If the RFID matches, cam.takepicture( ) is initiated after a delay, whereas the store jpeg, img.file close and time=millis( ) time commands are deployed. If the RFID does not match a digital.write servo fwd process 138 and a delay are implemented, whereafter digital.write servo return 155 and a delay 156 are initiated before the user is returned to the form 1 home form. If form 3 success packet is not received within 1 minute 149, form 4 147 is activated and displays an unable to send weight indicator, whereafter the user can press the no button 151 to return the form 1 home form or press an resend button 150 to resend the payload 146.

In some embodiments, the mobile application is provided to a mobile digital processing device at the time it is manufactured. In other embodiments, the mobile application is provided to a mobile digital processing device via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C#, Objective-C, Java™, Javascript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator®, Celsius, Bedrock, Flash Lite, .NET Compact Framework, Rhomobile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Those of skill in the art will recognize that several commercial forums are available for distribution of mobile applications including, by way of non-limiting examples, Apple® App Store, Google® Play, Chrome Web Store, BlackBerry® App World, App Store for Palm devices, App Catalog for webOS, Windows® Marketplace for Mobile, Ovi Store for Nokia® devices, Samsung® Apps, and Nintendo® DSi Shop.

Object Weighing and Release Platform

Figure 18:
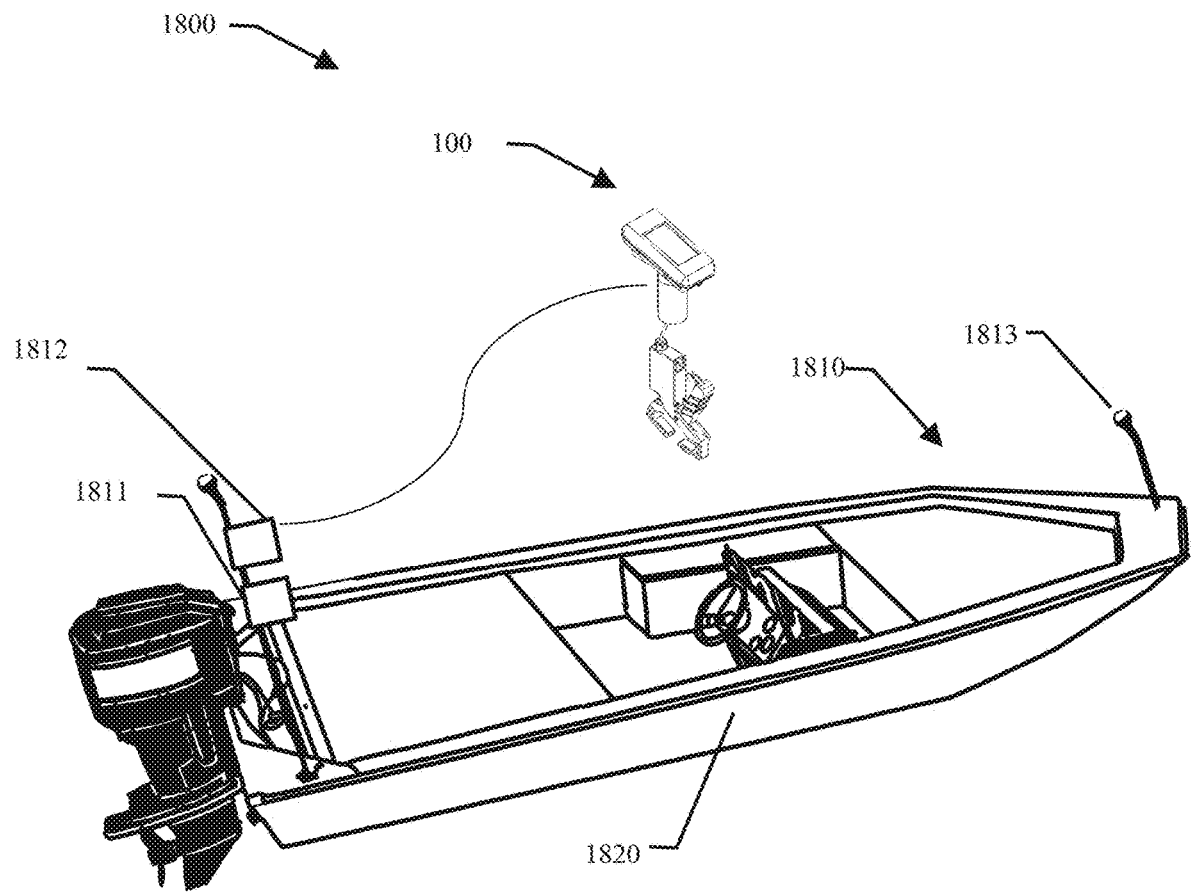
FIG. 18 shows an isometric view of exemplary embodiment of the object weighing and release system.

Another aspect provided herein, per FIG. 18, is an exemplary object weighing and release platform 1800 comprising: a mobile system 100 and a base station 1810. The mobile system 100 may comprise a mobile communication device. The base station 1810 may comprise a base communication device in communication with the mobile communication device. In some embodiments, at least one of the mobile system 100 and the base station 1810 comprise a mobile processor.

In some embodiments, the base communication device is configured to transmit, receive, or both, the direction of the engagement of the release mechanism 102, the disengagement of the release mechanism 102, the base sensed data, the weight of the object, the image, the base image, or any combination thereof. The base station may comprise a base sensor configured to measure a base sensed data. The base sensor may comprise a proximity sensor, a thermometer, GPS sensor, a light sensor, a microphone, an accelerometer, an inclinometer, a resistometer, a counter, a microphone, an RFID sensor, an ultrasonic sensor, a capacitive sensor, an inductive sensor, a magnetic sensor, a RADAR, a SONAR, a rain gauge, a wind gauge, an altimeter, or any combination thereof.

Figure 19:
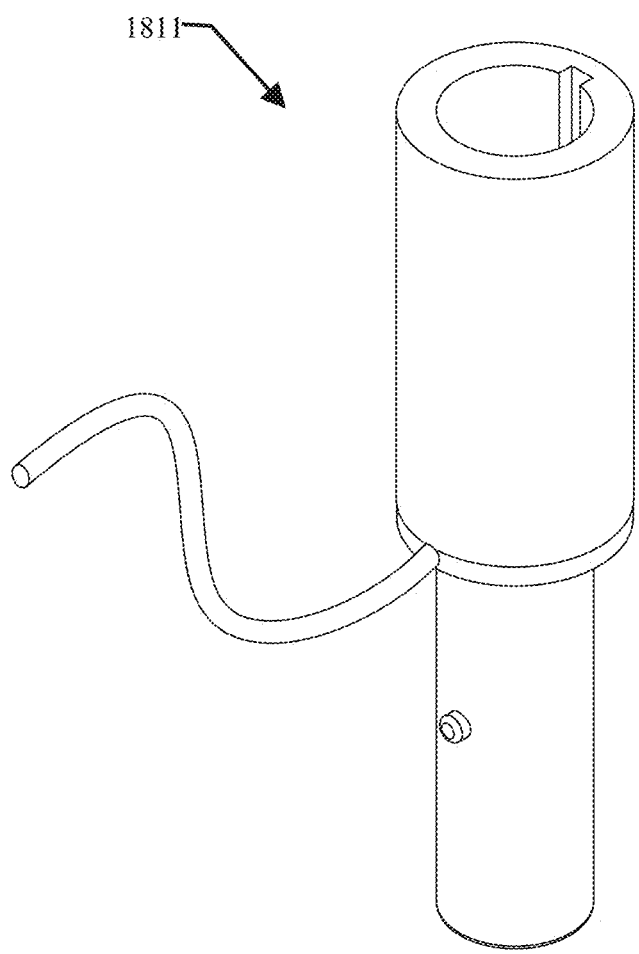
FIG. 19 shows an isometric transparent view of the first exemplary power adapter of FIG. 18.
Figure 20:
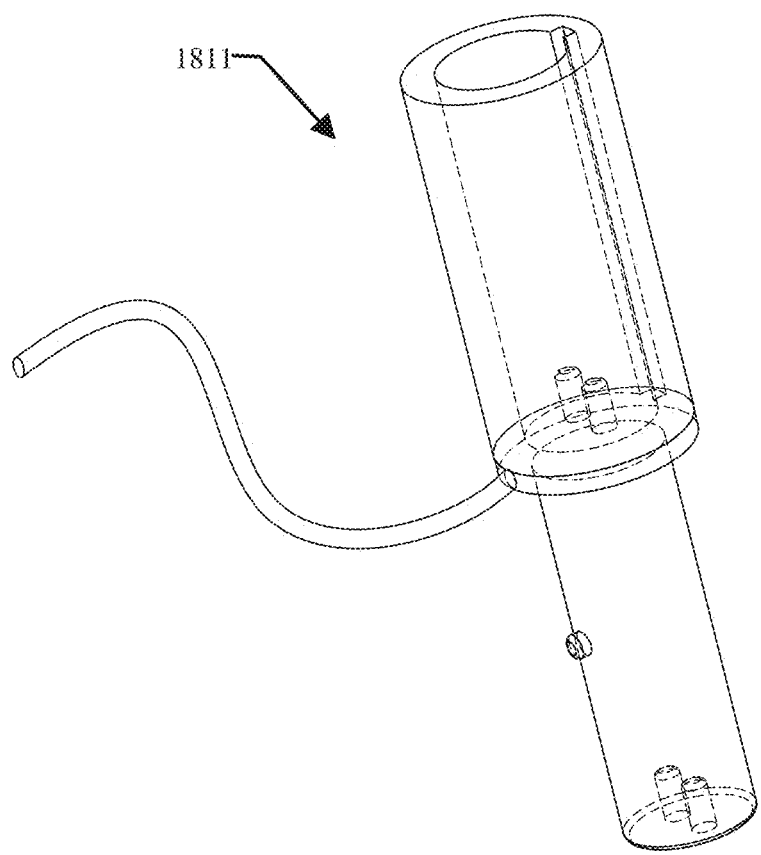
FIG. 20 shows an isometric view of an exemplary camera mount.

In some embodiments, the base station 1810 comprises a water vessel 1820 and a light 1813, an external camera 1812, and a power adapter 1811 comprise the visual surveillance system of the wireless scale and release system. An exemplary power adapter is shown in FIGS. 19-20 configured to transmit power from a standard boat light pole to the mobile system 100. The exemplary power adapter 1811 may have opposite male and female connectors to enable power transfer to the mobile system 100, the external camera 1812, the light, or any combination thereof. In one example, the power adapter 1811 has specific shapes to guide alignment of the adapter for attaching to or connecting various power port types, and comprises electrical circuit and power cord to step-up, step-down, or stabilize current and voltage being diverting to power any component of mobile wireless scale and release system. In some embodiments, the power adapter can have a single or a plurality of connection ports and shapes for power, ground, and communication.

Figure 21:
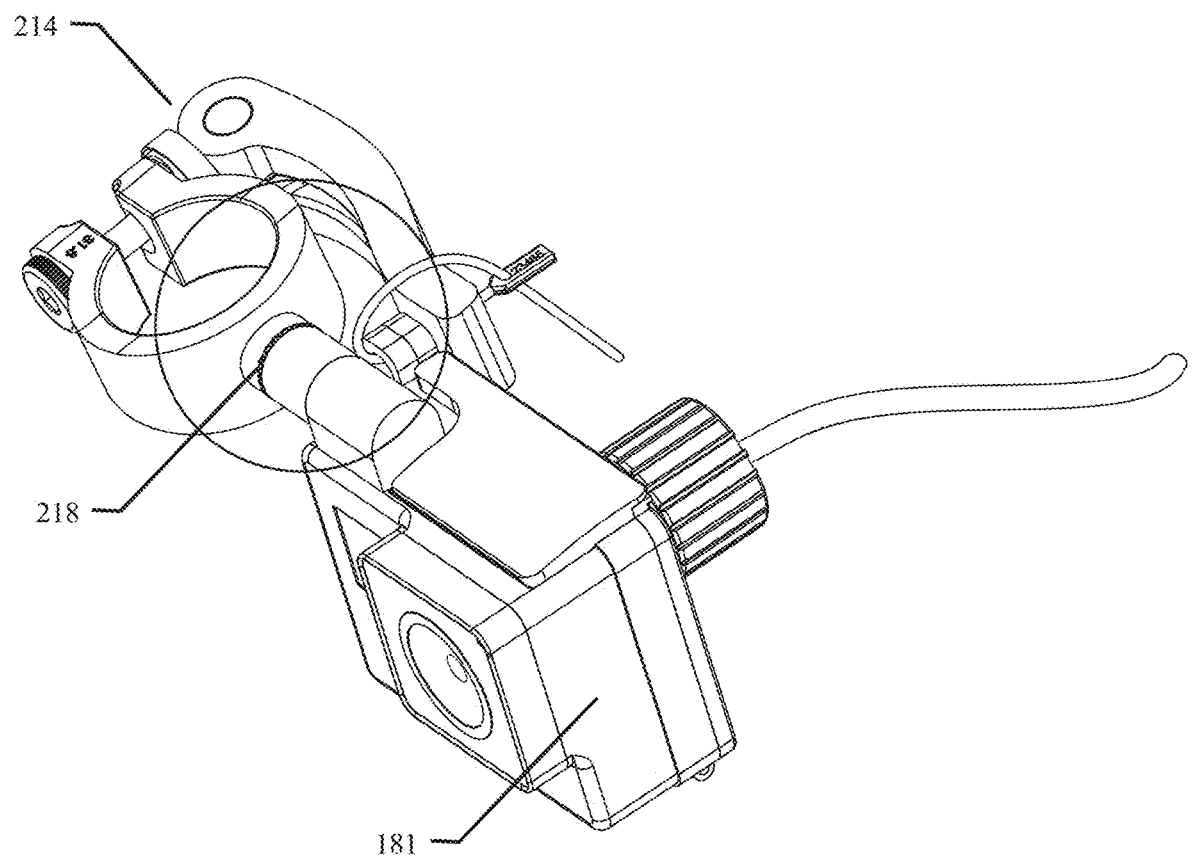
FIG. 21 shows an isometric view of a exemplary camera mount.
Figure 22:
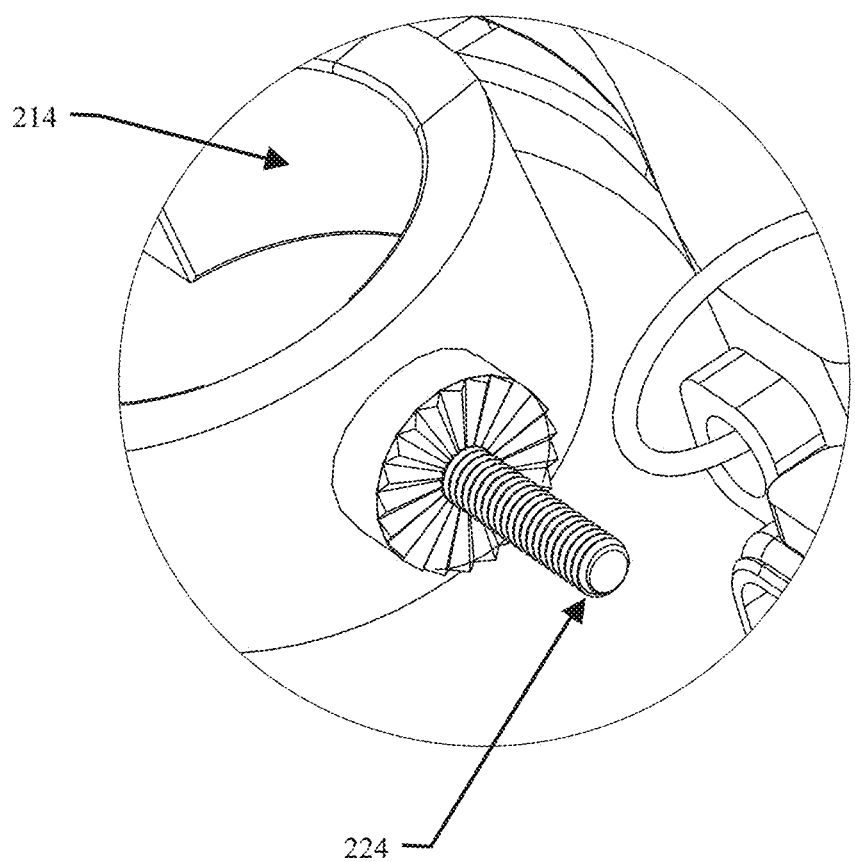
FIG. 22 shows an isometric detail view of an anti-rotation feature of the exemplary camera mount of FIG. 21.

An exemplary camera mount is shown in FIGS. 21-22 for housing at least one of the following: the external camera 1812 of the visual surveillance system and/or the base sensor, configured to mount to a boat light pole or any other sized pole. The camera mount may comprise a rotational tilting bracket 218, tilting bracket mounting screw 224 and a mounting bracket 214 capable of attached at any angle to around component of said structures. In some embodiments, the external camera 1812 comprises an action camera, GoPro camera, phone, mobile device with a camera, mirrored camera, mirrorless camera, or camcorder, or any combination thereof. Alternatively, the base station 1810 comprises a land structure. In some embodiments, the base station comprises two or more lights, buoys, water vessels, land structure, or any combination thereof. In some embodiments, the vessel comprises a vehicle, vessel, a drone, a boat, a ship, a canoe, or any combination thereof. In some embodiments, the land structure comprises a stand, a tripod, a building, or any combination thereof. In some embodiments, mobile system 100 is mounted, integrated, or connected to the base station 1810.

Digital Processing Device

In some embodiments, the platforms, systems, media, and methods described herein include a digital processing device, or use of the same. In further embodiments, the digital processing device includes one or more hardware central processing units (CPUs) or general purpose graphics processing units (GPGPUs) that carry out the device's functions. In still further embodiments, the digital processing device further comprises an operating system configured to perform executable instructions. In some embodiments, the digital processing device is optionally connected a computer network. In further embodiments, the digital processing device is optionally connected to the Internet such that it accesses the World Wide Web. In still further embodiments, the digital processing device is optionally connected to a cloud computing infrastructure. In other embodiments, the digital processing device is optionally connected to an intranet. In other embodiments, the digital processing device is optionally connected to a data storage device.

In accordance with the description herein, suitable digital processing devices include, by way of non-limiting examples, server computers, desktop computers, laptop computers, notebook computers, sub-notebook computers, netbook computers, netpad computers, set-top computers, media streaming devices, handheld computers, Internet appliances, mobile smartphones, tablet computers, personal digital assistants, video game consoles, and vehicles. Those of skill in the art will recognize that many smartphones are suitable for use in the system described herein. Those of skill in the art will also recognize that select televisions, video players, and digital music players with optional computer network connectivity are suitable for use in the system described herein. Suitable tablet computers include those with booklet, slate, and convertible configurations, known to those of skill in the art.

In some embodiments, the digital processing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft Windows®, Apple® Mac OS X®, UNIX®, and UNIX-like operating systems such as GNU/Linux®. In some embodiments, the operating system is provided by cloud computing. Those of skill in the art will also recognize that suitable mobile smart phone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®. Those of skill in the art will also recognize that suitable media streaming device operating systems include, by way of non-limiting examples, Apple TV®, Roku®, Boxee®, Google TV®, Google Chromecast®, Amazon-Fire®, and Samsung® HomeSync®. Those of skill in the art will also recognize that suitable video game console operating systems include, by way of non-limiting examples, Sony® PS3®, Sony® PS4®, Microsoft® Xbox 360®, Microsoft Xbox One, Nintendo® Wii®, Nintendo® Wii U®, and Ouya®.

In some embodiments, the device includes a storage and/or memory device. The storage and/or memory device is one or more physical apparatuses used to store data or programs on a temporary or permanent basis. In some embodiments, the device is volatile memory and requires power to maintain stored information. In some embodiments, the device is non-volatile memory and retains stored information when the digital processing device is not powered. In further embodiments, the non-volatile memory comprises flash memory. In some embodiments, the non-volatile memory comprises dynamic random-access memory (DRAM). In some embodiments, the non-volatile memory comprises ferroelectric random access memory (FRAM). In some embodiments, the non-volatile memory comprises phase-change random access memory (PRAM). In other embodiments, the device is a storage device including, by way of non-limiting examples, CD-ROMs, DVDs, flash memory devices, magnetic disk drives, magnetic tapes drives, optical disk drives, and cloud computing based storage. In further embodiments, the storage and/or memory device is a combination of devices such as those disclosed herein.

In some embodiments, the digital processing device includes a display to send visual information to a user. In some embodiments, the display is a liquid crystal display (LCD). In further embodiments, the display is a thin film transistor liquid crystal display (TFT-LCD). In some embodiments, the display is an organic light emitting diode (OLED) display. In various further embodiments, on OLED display is a passive-matrix OLED (PMOLED) or active-matrix OLED (AMOLED) display. In some embodiments, the display is a plasma display. In other embodiments, the display is a video projector. In yet other embodiments, the display is a head-mounted display in communication with the digital processing device, such as a VR headset. In further embodiments, suitable VR headsets include, by way of non-limiting examples, HTC Vive, Oculus Rift, Samsung Gear VR, Microsoft HoloLens, Razer OSVR, FOVE VR, Zeiss VR One, Avegant Glyph, Freefly VR headset, and the like. In still further embodiments, the display is a combination of devices such as those disclosed herein.

In some embodiments, the digital processing device includes an input device to receive information from a user. In some embodiments, the input device is a keyboard. In some embodiments, the input device is a pointing device including, by way of non-limiting examples, a mouse, trackball, track pad, joystick, game controller, or stylus. In some embodiments, the input device is a touch screen or a multi-touch screen. In other embodiments, the input device is a microphone to capture voice or other sound input. In other embodiments, the input device is a video camera or other sensor to capture motion or visual input. In further embodiments, the input device is a Kinect, Leap Motion, or the like. In still further embodiments, the input device is a combination of devices such as those disclosed herein.

Figure 25:
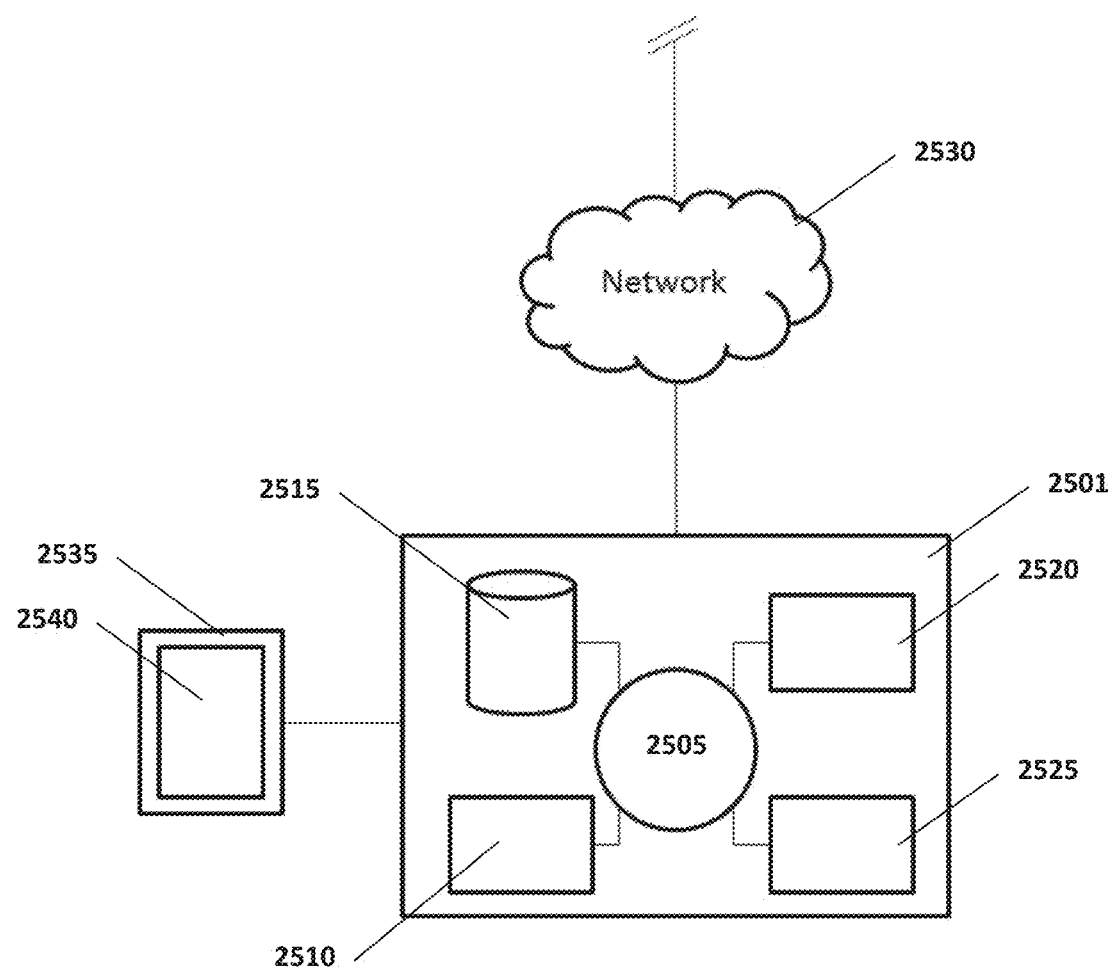
FIG. 25 shows a non-limiting example of a digital processing device; in this case, a device with one or more CPUs, a memory, a communication interface, and a display.

Referring to FIG. 25, in a particular embodiment, a digital processing device 2501 is programmed or otherwise configured to weigh and release an item. The device 2501 is programmed or otherwise configured to weigh and release an item. In this embodiment, the digital processing device 2501 includes a central processing unit (CPU, also "processor" and "computer processor" herein) 2505, which is optionally a single core, a multi core processor, or a plurality of processors for parallel processing. The digital processing device 2501 also includes memory or memory location 2510 (e.g., random-access memory, read-only memory, flash memory), electronic storage unit 2515 (e.g., hard disk), communication interface 2520 (e.g., network adapter) for communicating with one or more other systems, and peripheral devices 2525, such as cache, other memory, data storage and/or electronic display adapters. The memory 2510, storage unit 2515, interface 2520 and peripheral devices 2525 are in communication with the CPU 2505 through a communication bus (solid lines), such as a motherboard. The storage unit 2515 comprises a data storage unit (or data repository) for storing data. The digital processing device 2501 is optionally operatively coupled to a computer network ("network") 2530 with the aid of the communication interface 2520. The network 2530, in various cases, is the internet, an internet, and/or extranet, or an intranet and/or extranet that is in communication with the internet. The network 2530, in some cases, is a telecommunication and/or data network. The network 2530 optionally includes one or more computer servers, which enable distributed computing, such as cloud computing. The network 2530, in some cases, with the aid of the device 2501, implements a peer-to-peer network, which enables devices coupled to the device 2501 to behave as a client or a server.

Continuing to refer to FIG. 25, the CPU 2505 is configured to execute a sequence of machine-readable instructions, embodied in a program, application, and/or software. The instructions are optionally stored in a memory location, such as the memory 2510. The instructions are directed to the CPU 105, which subsequently program or otherwise configure the CPU 2505 to implement methods of the present disclosure. Examples of operations performed by the CPU 2505 include fetch, decode, execute, and write back. The CPU 2505 is, in some cases, part of a circuit, such as an integrated circuit. One or more other components of the device 2501 are optionally included in the circuit. In some cases, the circuit is an application specific integrated circuit (ASIC) or a field programmable gate array (FPGA).

Continuing to refer to FIG. 25, the storage unit 2515 optionally stores files, such as drivers, libraries and saved programs. The storage unit 2515 optionally stores user data, e.g., user preferences and user programs. The digital processing device 2501, in some cases, includes one or more additional data storage units that are external, such as located on a remote server that is in communication through an intranet or the internet.

Continuing to refer to FIG. 25, the digital processing device 2501 optionally communicates with one or more remote computer systems through the network 2530. For instance, the device 2501 optionally communicates with a remote computer system of a user. Examples of remote computer systems include personal computers (e.g., portable PC), slate or tablet PCs (e.g., Apple® iPad, Samsung® Galaxy Tab, etc.), smartphones (e.g., Apple® iPhone, Android-enabled device, Blackberry®, etc.), or personal digital assistants.

Methods as described herein are optionally implemented by way of machine (e.g., computer processor) executable code stored on an electronic storage location of the digital processing device 101, such as, for example, on the memory 2510 or electronic storage unit 2515. The machine executable or machine readable code is optionally provided in the form of software. During use, the code is executed by the processor 2505. In some cases, the code is retrieved from the storage unit 2515 and stored on the memory 2510 for ready access by the processor 2505. In some situations, the electronic storage unit 2515 is precluded, and machine-executable instructions are stored on the memory 2510.

Non-Transitory Computer Readable Storage Medium

In some embodiments, the platforms, systems, media, and methods disclosed herein include one or more non-transitory computer readable storage media encoded with a program including instructions executable by the operating system of an optionally networked digital processing device. In further embodiments, a computer readable storage medium is a tangible component of a digital processing device. In still further embodiments, a computer readable storage medium is optionally removable from a digital processing device. In some embodiments, a computer readable storage medium includes, by way of non-limiting examples, CD-ROMs, DVDs, flash memory devices, solid state memory, magnetic disk drives, magnetic tape drives, optical disk drives, cloud computing systems and services, and the like. In some cases, the program and instructions are permanently, substantially permanently, semi-permanently, or non-transitorily encoded on the media.

Computer Program

In some embodiments, the platforms, systems, media, and methods disclosed herein include at least one computer program, or use of the same. A computer program includes a sequence of instructions, executable in the digital processing device's CPU, written to perform a specified task. Computer readable instructions may be implemented as program modules, such as functions, objects, Application Programming Interfaces (APIs), data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

Web Application

In some embodiments, a computer program includes a web application. In light of the disclosure provided herein, those of skill in the art will recognize that a web application, in various embodiments, utilizes one or more software frameworks and one or more database systems. In some embodiments, a web application is created upon a software framework such as Microsoft® .NET or Ruby on Rails (RoR). In some embodiments, a web application utilizes one or more database systems including, by way of non-limiting examples, relational, non-relational, object oriented, associative, and XML database systems. In further embodiments, suitable relational database systems include, by way of non-limiting examples, Microsoft® SQL Server, mySQL™, and Oracle®. Those of skill in the art will also recognize that a web application, in various embodiments, is written in one or more versions of one or more languages. A web application may be written in one or more markup languages, presentation definition languages, client-side scripting languages, server-side coding languages, database query languages, or combinations thereof. In some embodiments, a web application is written to some extent in a markup language such as Hypertext Markup Language (HTML), Extensible Hypertext Markup Language (XHTML), or eXtensible Markup Language (XML). In some embodiments, a web application is written to some extent in a presentation definition language such as Cascading Style Sheets (CSS). In some embodiments, a web application is written to some extent in a client-side scripting language such as Asynchronous Javascript and XML (AJAX), Flash® Actionscript, Javascript, or Silverlight®. In some embodiments, a web application is written to some extent in a server-side coding language such as Active Server Pages (ASP), ColdFusion®, Perl, Java™, JavaServer Pages (JSP), Hypertext Preprocessor (PHP), Python™, Ruby, Tcl, Smalltalk, WebDNA®, or Groovy. In some embodiments, a web application is written to some extent in a database query language such as Structured Query Language (SQL). In some embodiments, a web application integrates enterprise server products such as IBM® Lotus Domino®. In some embodiments, a web application includes a media player element. In various further embodiments, a media player element utilizes one or more of many suitable multimedia technologies including, by way of non-limiting examples, Adobe® Flash®, HTML 5, Apple® QuickTime®, Microsoft® Silverlight®, Java™, and Unity®.

Figure 26:
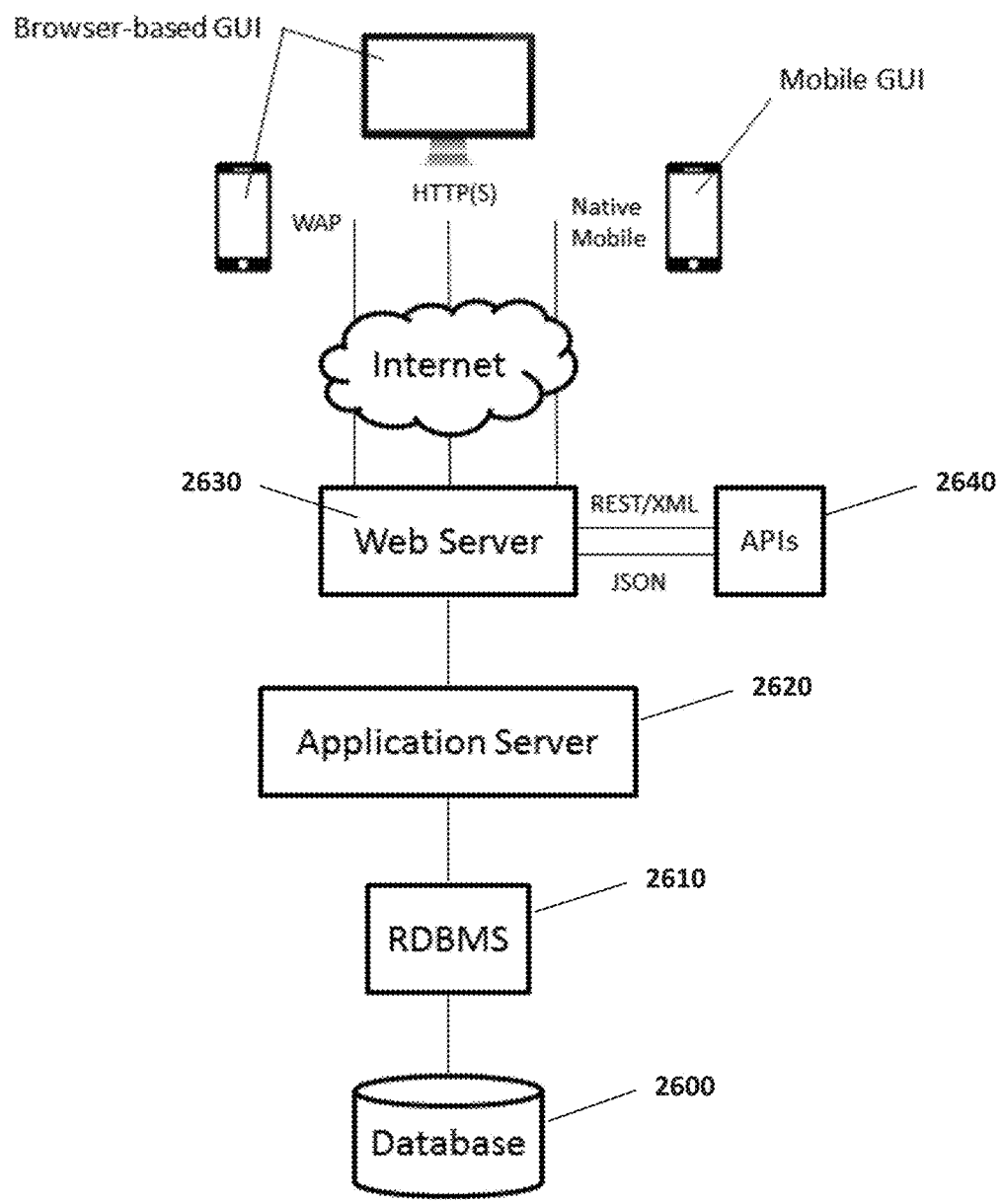
FIG. 26 shows a non-limiting example of a web/mobile application provision system; in this case, a system providing browser-based and/or native mobile user interfaces.

Referring to FIG. 26, in a particular embodiment, an application provision system comprises one or more databases 2600 accessed by a relational database management system (RDBMS) 2610. Suitable RDBMSs include Firebird, MySQL, PostgreSQL, SQLite, Oracle Database, Microsoft SQL Server, IBM DB2, IBM Informix, SAP Sybase, SAP Sybase, Teradata, and the like. In this embodiment, the application provision system further comprises one or more application severs 2620 (such as Java servers, .NET servers, PHP servers, and the like) and one or more web servers 2630 (such as Apache, IIS, GWS and the like). The web server(s) optionally expose one or more web services via app application programming interfaces (APIs) 2640. Via a network, such as the internet, the system provides browser-based and/or mobile native user interfaces.

Figure 27:
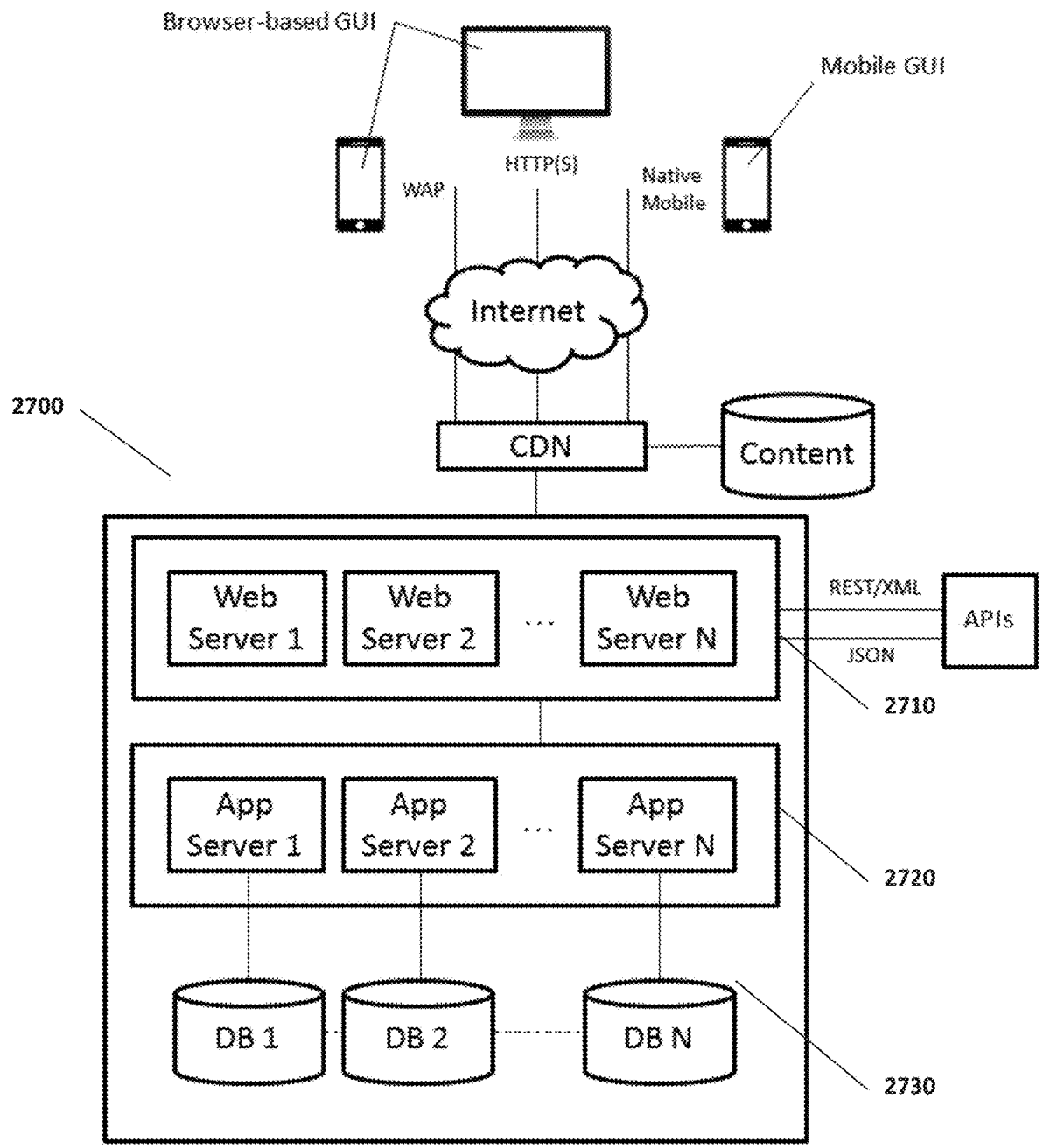
FIG. 27 shows a non-limiting example of a cloud-based web/mobile application provision system; in this case, a system comprising an elastically load balanced, auto-scaling web server and application server resources as well as synchronously replicated databases.

Referring to FIG. 27, in a particular embodiment, an application provision system alternatively has a distributed, cloud-based architecture 2700 and comprises elastically load balanced, auto-scaling web server resources 2710 and application server resources 2720 as well synchronously replicated databases 2730.

Mobile Application

In some embodiments, a computer program includes a mobile application provided to a mobile digital processing device. In some embodiments, the mobile application is provided to a mobile digital processing device at the time it is manufactured. In other embodiments, the mobile application is provided to a mobile digital processing device via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C#, Objective-C, Java™, Javascript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator®, Celsius, Bedrock, Flash Lite, .NET Compact Framework, Rhomobile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Those of skill in the art will recognize that several commercial forums are available for distribution of mobile applications including, by way of non-limiting examples, Apple® App Store, Google® Play, Chrome Web Store, BlackBerry® App World, App Store for Palm devices, App Catalog for webOS, Windows® Marketplace for Mobile, Ovi Store for Nokia® devices, Samsung® Apps, and Nintendo® DSi Shop.

Standalone Application

In some embodiments, a computer program includes a standalone application, which is a program that is run as an independent computer process, not an add-on to an existing process, e.g., not a plug-in. Those of skill in the art will recognize that standalone applications are often compiled. A compiler is a computer program(s) that transforms source code written in a programming language into binary object code such as assembly language or machine code. Suitable compiled programming languages include, by way of non-limiting examples, C, C++, Objective-C, COBOL, Delphi, Eiffel, Java™, Lisp, Python™, Visual Basic, and VB .NET, or combinations thereof. Compilation is often performed, at least in part, to create an executable program. In some embodiments, a computer program includes one or more executable complied applications.

Web Browser Plug-in

In some embodiments, the computer program includes a web browser plug-in (e.g., extension, etc.). In computing, a plug-in is one or more software components that add specific functionality to a larger software application. Makers of software applications support plug-ins to enable third-party developers to create abilities which extend an application, to support easily adding new features, and to reduce the size of an application. When supported, plug-ins enable customizing the functionality of a software application. For example, plug-ins are commonly used in web browsers to play video, generate interactivity, scan for viruses, and display particular file types. Those of skill in the art will be familiar with several web browser plug-ins including, Adobe® Flash® Player, Microsoft® Silverlight®, and Apple® QuickTime®.

In view of the disclosure provided herein, those of skill in the art will recognize that several plug-in frameworks are available that enable development of plug-ins in various programming languages, including, by way of non-limiting examples, C++, Delphi, Java™, PHP, Python™, and VB .NET, or combinations thereof.

Web browsers (also called Internet browsers) are software applications, designed for use with network-connected digital processing devices, for retrieving, presenting, and traversing information resources on the World Wide Web. Suitable web browsers include, by way of non-limiting examples, Microsoft® Internet Explorer®, Mozilla® Firefox®, Google® Chrome, Apple® Safari®, Opera Software® Opera®, and KDE Konqueror. In some embodiments, the web browser is a mobile web browser. Mobile web browsers (also called microbrowsers, mini-browsers, and wireless browsers) are designed for use on mobile digital processing devices including, by way of non-limiting examples, handheld computers, tablet computers, netbook computers, subnotebook computers, smartphones, music players, personal digital assistants (PDAs), and handheld video game systems. Suitable mobile web browsers include, by way of non-limiting examples, Google® Android® browser, RIM BlackBerry® Browser, Apple® Safari®, Palm® Blazer, Palm® WebOS® Browser, Mozilla® Firefox® for mobile, Microsoft® Internet Explorer® Mobile, Amazon® Kindle® Basic Web, Nokia® Browser, Opera Software® Opera® Mobile, and Sony® PSP™ browser.

Software Modules

In some embodiments, the platforms, systems, media, and methods disclosed herein include software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on cloud computing platforms. In some embodiments, software modules are hosted on one or more machines in one location. In other embodiments, software modules are hosted on one or more machines in more than one location.

Databases

In some embodiments, the platforms, systems, media, and methods disclosed herein include one or more databases, or use of the same. In view of the disclosure provided herein, those of skill in the art will recognize that many databases are suitable for weighing and releasing an item. In various embodiments, suitable databases include, by way of non-limiting examples, relational databases, non-relational databases, object oriented databases, object databases, entity-relationship model databases, associative databases, and XML databases. Further non-limiting examples include SQL, PostgreSQL, MySQL, Oracle, DB2, and Sybase. In some embodiments, a database is internet-based. In further embodiments, a database is web-based. In still further embodiments, a database is cloud computing-based. In other embodiments, a database is based on one or more local computer storage devices.

Terms and Definitions

Unless otherwise defined, all technical terms used herein have the same meaning as commonly understood by one of ordinary skill in the art to which this disclosure belongs.

As used herein, the singular forms "a," "an," and "the" include plural references unless the context clearly dictates otherwise. Any reference to "or" herein is intended to encompass "and/or" unless otherwise stated.

As used herein, the term "about" refers to an amount that is near the stated amount by about 10%, 5%, or 1%, including increments therein.

Unless otherwise defined, all technical terms used herein have the same meaning as commonly understood by one of ordinary skill in the art to which this disclosure belongs.

EXAMPLES

Example 1—Weighing and Releasing an Object

In one example, the input comprises multiple buttons configured to perform various functions. The buttons include a tare button, a power button, a return button, two navigation arrow buttons, and a cancel ("X") button (see FIG. 12), before weighing the object, the user presses a tare button to tare the weight of the scale. The tare feature enables accurate measurement to correct for load cell and environmental errors. The camera is activated during the tare process to confirm and/or ensure that no force is being imparted on the scale. The display then displays the tared weight of 0.00 or close to 0.00. If the user does not agree with the displayed zeroed weight, the user may depress a manual tare button.

Upon loading an item onto the release mechanism, the user can wait until a displayed weight begins to stabilize before pressing a weigh button. Upon pressing the weigh button, the mobile processor captures an image of the object in the release mechanism. In this case, the system is configured such that Capturing and storing the image of the object prevents a user from manually altering the scale measurement.

The weight of the object is displayed on the display, and the user is prompted to confirm the weight of the object. In this example, The user is prompted to agree or disagree with the displayed weight before it is transmitted by the mobile communication device. The user is able to press a no button if they do not agree with the displayed weight. The user's agreement may additionally comprise receiving a signature, an identification code, or any combination thereof, as a confirmation and/or security measure. A surrounding environmental condition is optionally recorded by a base sensor, the camera 104 and/or the external camera 1812 on or associated with the object before, during, or after the weighing of the object.

Upon agreement of the measured weight, the mobile communication device transmits at least one of the weight, the activation of the release mechanism, the input, and the image of the object. The mobile communication device optionally transmits a GPS location associated with a location of the release of the object. The transmission is sent to a base communication device on a base station. Upon successful transmission, confirmation of receipt from the base station, or both, the display shows an indication that the transmission was successful. Alternatively, if the transmission is not successful, the mobile communication device optionally reattempts transmission, displays an error message to the user, or both. The user is able to submit an input to retry transmission at a user specified, or predetermined later time.

The user then presses a release button to release the object from the release mechanism. The camera additionally captures one or more images of the item, its surrounding, or both as the item is being released. The camera may alternatively or additionally capture one or more images of the item, its surrounding, or both after a set delay from the time the item was released. The display prompts the user to present an RFID tag before the item is released from the release mechanism. The mobile processor determines a release confirmation based on a wired communication with an RFID reader or an RFID confirmation received via the mobile communication device. The camera is able to capture one or more images of the item, its surrounding, or both as the RFID tag is presented. The camera can alternatively or additionally capture one or more images of the item, its surrounding, or both after a set delay from the time as the RFID tag is presented.

The user can select a home button to return to a home display to restart the weighing and releasing process. If the release mechanism is stuck closed or if a user wants to abort the process, the user is able to depress a release button to automatically release the release mechanism.

Example 2—Weighing and Releasing an Animal

In another example the object comprises an animal. The animal may be a fish, a bird, a mammal, or an insect. The user tares the scale of the system before attaching the animal to the release mechanism. Upon loading an item onto the release mechanism, the user waits until a displayed weight begins to stabilize before pressing a weigh button. Upon pressing the weight button, the mobile processor captures an image of the animal in the release mechanism.

The weight of the animal is then displayed on the display, and the user is prompted to confirm the weight of the animal. The user is prompted to agree or disagree with the displayed weight before it is transmitted by the mobile communication device. For instance, when the display shows an obviously incorrect weight of 1 pound for a 2 foot fish, a tare or instrumentation error may have occurred and the fish may need to be reweighed. The user then presses a no button if they do not agree with the displayed weight. The user's agreement additionally comprises receiving a signature, an identification code, or any combination thereof, as a confirmation and/or security measure. This agreement corresponds with rules or regulations associated with the particular animal or competition event. A surrounding environmental condition is recorded by a sensor on or associated with the animal before, during, or after the weighing of the object.

Upon agreement of the measured weight, the mobile communication device transmits at least one of the weight, the activation of the release mechanism, the input, and the image of the object. The mobile communication device further transmits a GPS location associated with a location of the release of the object. The transmission is sent to a base communication device on a base station. The base station may comprise a judging booth, a law enforcement authority, or an intermediate communication point. Upon successful transmission, confirmation of receipt from the base station, or both, the display shows an indication that the transmission was successful. Alternatively, if the transmission is not successful, the mobile communication device reattempts transmission, displays an error message to the user, or both. The user can also submit an input to retry transmission at a user specified, or predetermined later time.

The user then presses a release button to release the animal from the release mechanism. The release mechanism releases the animal without requiring any manipulation or interference, or human interaction. The camera additionally captures one or more images of the animal, its surrounding, or both as the animal is being released. The surrounding may comprise a waterway or land-based location where the animal is freed. The image of the animal and its surrounding serves as a confirmation that the animal has been released, a confirmation of the release location, or both. The camera can alternatively or additionally capture one or more images of the animal, its surrounding, or both after a set delay from the time the animal was released. The display prompts the user to present an RFID tag before the animal is released from the release mechanism. The mobile processor determines a release confirmation based on a wired communication with an RFID reader or an RFID confirmation received via the mobile communication device. The camera captures one or more images of the animal, its surrounding, or both as the RFID tag is presented. The camera can alternatively or additionally capture one or more images of the animal, its surrounding, or both after a set delay from the time as the RFID tag is presented.

The user then selects a home button to return to a home display to restart the weighing and releasing process. If the release mechanism is stuck closed or if a user wants to abort the process, the user is able to depress a release button to automatically release the release mechanism.

What is claimed is:

1. An object weighing and release system comprising:
a) a scale configured to measure a weight of the object;
b) an automated release mechanism adjoined to the scale, wherein the automated release mechanism allows for release of the object at a release location;
c) an input device configured to receive an input;
d) a display, attached to the scale;
e) a mobile communication device within the scale;
f) a mobile processor in functional communication with the scale, the automated release mechanism, the input device, the display, and the mobile communication device; and
g) an energy storage device having a power supply.

2. The system of claim 1: further comprising:
a non-rigid cable adjoined to the automated release system, the scale, the mobile processor and the energy storage device, wherein the non-rigid cable facilitates transfer of the power supply from the energy storage device to the automated release system and functional communication between the mobile processor and the automated release mechanism.

3. The system of claim 1, further comprising:
a camera, arranged within the scale, facing generally downward and towards the automated release mechanism, in functional communication with the mobile processor and configured to capture an image of the object, the release location, a surrounding of the object, or any combination thereof.

4. The system of claim 1, wherein the scale comprises a strain gauge, a load cell, a transducer, a spring, or any combination thereof.

5. The system of claim 1, wherein the automated release mechanism comprises:
   a) a first clamp arm; and
   b) a second clamp arm attached to the first clamp arm and comprising a clamping mechanism configured to engage and disengage with the first clamp arm to weigh and release the object.

6. The system of claim 5, wherein the clamping mechanism comprises a motor, a solenoid, a magnet, a gear, a pulley, or any combination thereof.

7. The system of claim 1, wherein the input device comprises a touchscreen, a button, a camera, a microphone, an input port, or any combination thereof.

8. The system of claim 1, wherein the mobile processor in functional communication with the camera is configured to adjust a camera setting.

9. The system of claim 8, wherein the camera setting comprises a number of pixels, an aperture size, an exposure rate, a frame rate, a color tint, or any combination thereof.

10. The system of claim 1, wherein the display comprises an LCD screen, an LED screen, a PDP display, an OLED display, a TFT display, or any combination thereof.

11. The system of claim 1, wherein the display and the input comprise a single touch screen.

12. The system of claim 1, further comprising a sensor configured to measure a sensed data.

13. The system of claim 12, wherein the automated release system is triggered by the sensed data, therein engaging or disengaging the automated release mechanism.

14. The system of claim 12, wherein the display is configured to display the image, the weight, the input, the sensed data, or any combination thereof.

15. The system of claim 12, wherein the mobile communication device is configured to transmit the image, the weight, the input, the sensed data, or any combination thereof.

16. The system of claim 15, wherein the mobile communication device is configured to transmit the image, the weight, the input, the sensed data, or any combination thereof to a base station, and to receive a base sensed data, an instruction, or both from the base station.

17. The system of claim 1, further comprising:
   an external camera attached to a power source of a water vessel;
   wherein the external camera is configured to capture an image of the object, the release location, a surrounding of the object, or both.

18. The system of claim 17, wherein the external camera further comprises a power adapter, wherein the power adapter is coupled to the power source of the water vessel and the external camera.

19. The system of claim 16, wherein the instruction comprises a direction to engage the automated release mechanism, a direction to disengage the automated release mechanism, or both.

20. The system of claim 1, wherein the mobile communication device comprises a Wi-Fi device, a cellular device, a Bluetooth device, a satellite mobile communication device, a radio device, a LoRa device, a WLAN device, a microwave communication device, or any combination thereof.

21. The system of claim 1, further comprising:
   a waterproof housing;
   wherein at least one of the camera, the scale, the automated release mechanism, the input device, the display, the mobile communication device, and the mobile-processor are within the waterproof housing, attached to the waterproof housing, or within and attached to the waterproof housing.

22. The system of claim 21, wherein the automated release mechanism is attached to the scale, and wherein the scale is attached to the waterproof housing.

23. The system of claim 21, wherein the waterproof housing comprises at least one of an antitampering mechanism, and a unique identification marker.

24. The system of claim 23, wherein the anti-tampering mechanism comprises a lock, a fingerprint reader, an iris scanner, communication encryption, password software, or any combination thereof.

25. The system of claim 1, wherein the mobile processor is configured to provide a mobile application comprising:
   a) a software module receiving the input and the weight of the object;
   b) a software module disengaging the automated release mechanism;
   c) a software module directing the camera to capture the image, receive the image, or both;
   d) a software module engaging the automated release mechanism; and
   e) a software module directing the display, the mobile communication device, or both based on the input, the engagement of the automated release mechanism, the disengagement of the automated release mechanism, the weight of the object, the image, or any combination thereof.

26. The system of claim 25, wherein the software module directs the mobile communication device to transmit at least one of the engagement of the automated release mechanism, the disengagement of the automated release mechanism, the weight of the object, and the image.

27. The system of claim 26, wherein the software module directs the mobile communication device to transmit at least one of the engagement of the automated release mechanism, the disengagement of the automated release mechanism, the weight of the object, the image based on the input.

28. The system of claim 25, wherein the mobile application further comprises a software module recording a tare weight based on the input and a scale measurement recorded while the automated release mechanism is disengaged.

29. The system of claim 25, wherein the mobile application further comprises a software module receiving a base sensed data from a base sensor.

30. The system of claim 29, wherein the software module directs the mobile communication device to transmit at least one of the engagement of the automated release mechanism, the disengagement of the automated release mechanism, the weight of the object, the image based on the base sensed data.

31. The system of claim 25, wherein the mobile application further comprises a software module applying an image processing algorithm to one or more of the weight of the object, the input, and the image to determine a volume, length, width, thickness species or any combination thereof of the item.

* * * * *